(12) United States Patent
Ogasawara et al.

(10) Patent No.: US 10,155,155 B2
(45) Date of Patent: *Dec. 18, 2018

(54) ATTACHMENT AND GAME SYSTEM

(71) Applicant: NINTENDO CO., LTD., Kyoto-shi, Kyoto (JP)

(72) Inventors: Yoshiyasu Ogasawara, Kyoto (JP); Fumihiko Inoue, Kyoto (JP); Yoshitaka Tamura, Kyoto (JP); Shinta Minagawa, Kyoto (JP); Hitoshi Tsuchiya, Kyoto (JP); Yasuyuki Shimohata, Kyoto (JP); Shinichi Kinuwaki, Kyoto (JP); Naoki Hatta, Kyoto (JP); Takeshi Nishikawa, Kyoto (JP); Kazuyoshi Osawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,162

(22) Filed: Jul. 21, 2017

(65) Prior Publication Data

US 2018/0043248 A1    Feb. 15, 2018

(30) Foreign Application Priority Data

Aug. 9, 2016    (JP) .................................. 2016-156340

(51) Int. Cl.
*A63F 13/213*    (2014.01)
*A63F 13/211*    (2014.01)
(Continued)

(52) U.S. Cl.
CPC .......... *A63F 13/213* (2014.09); *A63F 13/211* (2014.09); *A63F 13/23* (2014.09);
(Continued)

(58) Field of Classification Search
CPC ...... A63F 13/213; A63F 13/24; A63F 13/245; A63F 13/90; A63F 13/98
See application file for complete search history.

(56) References Cited

U.S. PATENT DOCUMENTS

| 8,482,540 | B1 | 7/2013 | Reeves et al. |
| 9,996,107 | B2 | 6/2018 | Inoue et al. |
| (Continued) | | | |

FOREIGN PATENT DOCUMENTS

JP    2010-017387    1/2010

OTHER PUBLICATIONS

European Search Report dated Jun. 22, 2016 issued in corresponding European Application No. 16152949.0 (8 pgs.).

(Continued)

*Primary Examiner* — Jay Liddle
(74) *Attorney, Agent, or Firm* — Nixon & Vanderhye PC

(57) ABSTRACT

An attachment configured to be attached to a game controller with a camera is provided. The attachment includes a housing and an operation portion in the housing. The housing includes a support portion which supports the game controller such that a direction of shooting of the camera is oriented to the inside of the housing. The operation portion has a movable portion in the housing, a position of the movable portion being changed in accordance with a pressing operation onto the operation portion, and at least one of a shape of and a pattern on the movable portion viewed from the camera being changed in accordance with a rotation operation onto the operation portion.

12 Claims, 30 Drawing Sheets

(51) Int. Cl.
*A63F 13/23* (2014.01)
*A63F 13/25* (2014.01)
*A63F 13/32* (2014.01)
*A63F 13/98* (2014.01)

(52) U.S. Cl.
CPC .............. *A63F 13/25* (2014.09); *A63F 13/32* (2014.09); *A63F 13/98* (2014.09)

(56) References Cited

U.S. PATENT DOCUMENTS

| | | |
|---|---|---|
| 2006/0256090 A1 | 11/2006 | Huppi |
| 2010/0007528 A1 | 1/2010 | Urata et al. |
| 2011/0090177 A1 | 4/2011 | Chuang |
| 2012/0287051 A1 | 11/2012 | Takabu |
| 2018/0028913 A1* | 2/2018 | Onozawa .............. A63F 13/211 |

OTHER PUBLICATIONS

Office Action dated Nov. 30, 2017 issued in U.S. Appl. No. 15/010,153 (14 pgs.).

Office Action dated Jul. 17, 2018 issued in U.S. Appl. No. 15/656,191 (7 pgs.).

\* cited by examiner

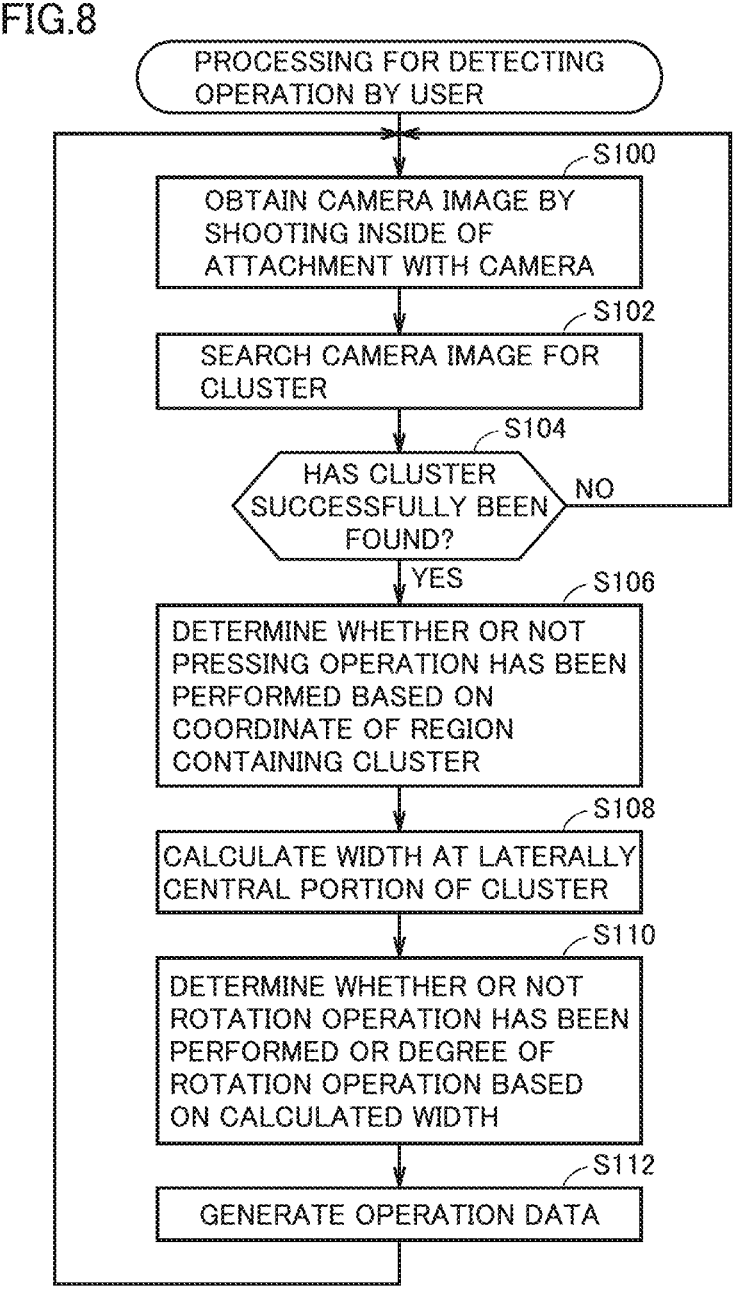

332A'

332A"

332A'''

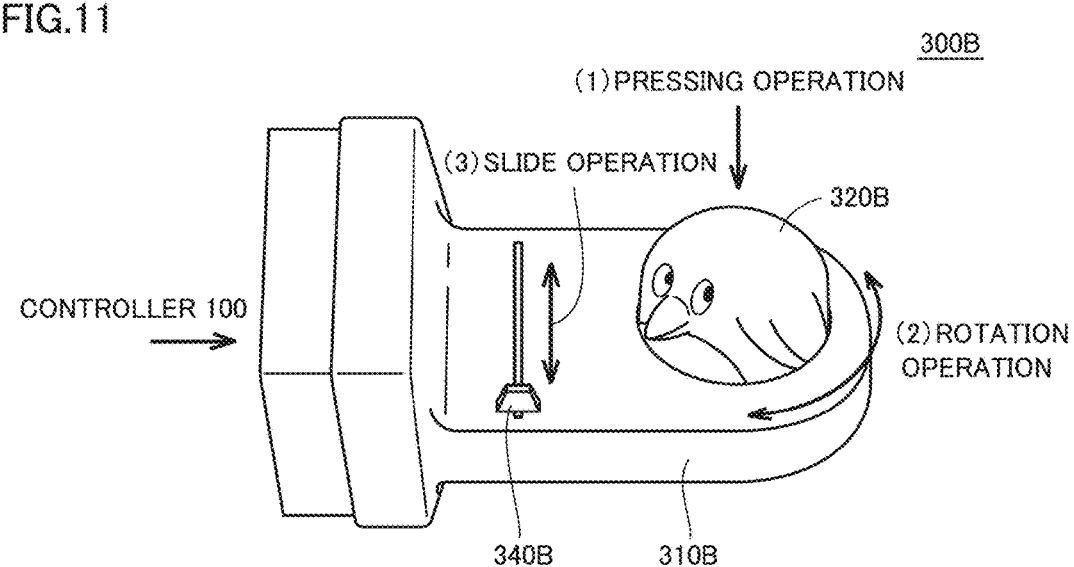

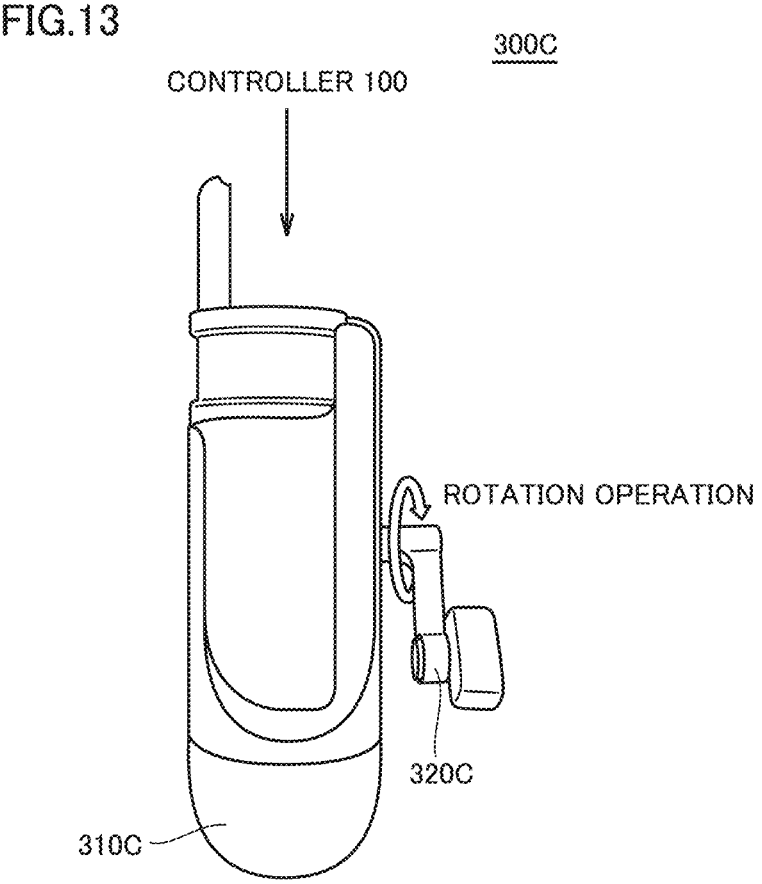

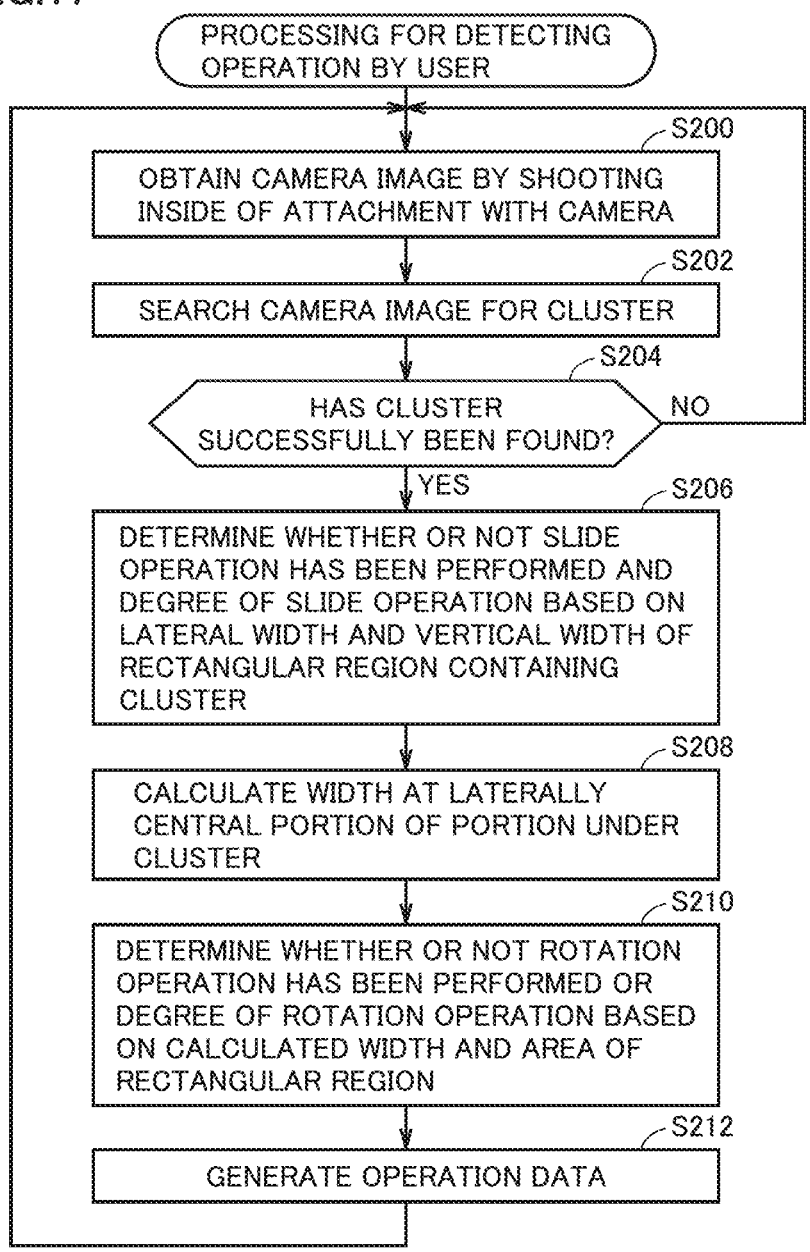

ATTACHMENT AND GAME SYSTEM

This nonprovisional application is based on Japanese Patent Application No. 2016-156340 filed with the Japan Patent Office on Aug. 9, 2016, the entire contents of which are hereby incorporated by reference.

FIELD

The present disclosure relates to an attachment and a game system including the attachment.

BACKGROUND AND SUMMARY

An accessory which adds functions to a portable device by being connected to the portable device has conventionally been available. For example, such a technique that another controller as an accessory is connected to a connector provided in a controller of a game device has been disclosed. According to this technique, further various game operations can be performed by using two controllers. The accessory disclosed in the background art as described above requires circuitry for communicating with a portable device or circuitry for information processing for generating information to be transmitted to the portable device, and such a configuration is yet to be improved.

An exemplary embodiment provides an attachment which can implement various game operations by being configured to be attached to a game controller or the like while it maintains a simplified configuration and a game system including the attachment.

An exemplary embodiment provides an attachment configured to be attached to a game controller with a camera. The attachment includes a housing and an operation portion in the housing. The housing includes a support portion which supports the game controller such that a direction of shooting of the camera is oriented to the inside of the housing. The operation portion has a movable portion in the housing, a position of the movable portion being changed in accordance with a pressing operation onto the operation portion, and at least one of a shape of and a pattern on the movable portion viewed from the camera being changed in accordance with a rotation operation onto the operation portion.

The movable portion may be made of a reflective material.

At least one of the shape of and the pattern on the movable portion viewed from the camera may gradually be changed by rotation along a direction substantially in parallel to a direction of the pressing operation onto the operation portion.

The movable portion may have a varying width viewed from the camera.

The movable portion may be formed in a tapered shape.

A position of the movable portion viewed from the camera may be changed in accordance with a sliding operation onto the operation portion.

The operation portion may have a first slide mechanism which slides in a direction substantially in parallel to the direction of shooting of the camera.

The operation portion may have a second slide mechanism which slides in a direction substantially perpendicular to the direction of shooting of the camera.

The camera may include an infrared camera.

The operation portion may further include a biasing mechanism.

An exemplary embodiment provides a game system that includes a game controller with an infrared camera, an attachment which may support the game controller, and a main body which may communicate with the game controller. The attachment includes a housing and an operation portion in the housing. The housing includes a support portion which supports the game controller such that a direction of shooting of the infrared camera is oriented to the inside of the housing. The operation portion has a movable portion in the housing, a position of the movable portion being changed in accordance with a pressing operation onto the operation portion, and at least one of a shape of and a pattern on the movable portion viewed from the infrared camera being changed in accordance with a rotation operation onto the operation portion. The game controller transmits image data on an infrared image obtained by shooting with the infrared camera to the main body. The main body detects an operation onto the operation portion based on the image data and performs corresponding game processing based on the detected operation.

An exemplary embodiment provides an attachment configured to be attached to a game controller with a camera. The attachment includes a housing and an operation portion in the housing. The housing includes a support portion which supports the game controller such that a direction of shooting of the camera is oriented to the inside of the housing. The operation portion has a movable portion in the housing, a position of the movable portion being changed in accordance with a sliding operation onto the operation portion along a surface of the housing, and at least one of a shape of and a pattern on the movable portion viewed from the camera being changed in accordance with a rotation operation onto the operation portion.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 8 shows an exemplary illustrative non-limiting flowchart illustrating a processing procedure for detecting an operation by the user onto the attachment according to the first embodiment.

FIG. 11 shows an exemplary illustrative non-limiting drawing illustrating appearance of an attachment according to a first modification of the first embodiment.

FIG. 13 shows an exemplary illustrative non-limiting drawing illustrating appearance of an attachment according to a second modification of the first embodiment.

FIG. 17 shows an exemplary illustrative non-limiting flowchart illustrating a processing procedure for detecting an operation by the user onto the attachment according to the second embodiment.

DETAILED DESCRIPTION OF NON-LIMITING EXAMPLE EMBODIMENTS

Figure 1:
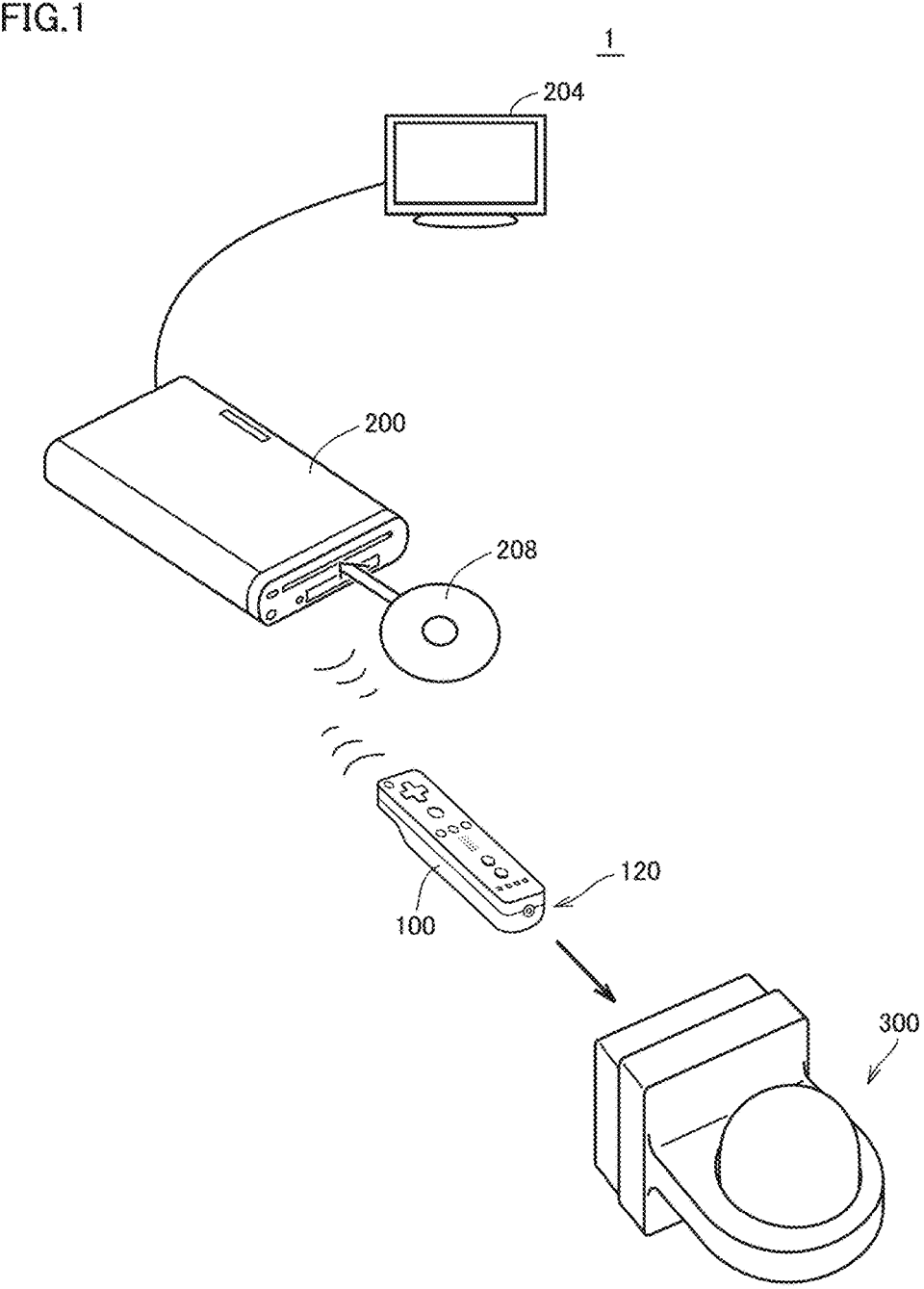
FIG. 1 shows an exemplary illustrative non-limiting drawing illustrating one example of appearance of a game system according to the present embodiment.

The present embodiment will be described in detail with reference to the drawings. The same or corresponding elements in the drawings have the same reference characters allotted and description thereof will not be repeated.

<A. Configuration of Game System>

A configuration of a game system 1 according to the present embodiment will initially be described.

(a1: Overall Configuration of System)

One example of appearance of game system 1 according to the present embodiment will be described with reference to FIG. 1. Game system 1 includes one game controller 100 or a plurality of game controllers 100 (hereinafter also simply denoted as a "controller 100") and a main body 200 which can communicate with one controller 100 or a plurality of controllers 100. A display 204 such as a television is connected to main body 200 and video images and/or voice and sound are output from display 204 in accordance with video signals and/or audio signals output from main body 200.

Though FIG. 1 shows a configuration example in which information is exchanged between controller 100 and main body 200 through radio communication, information may be exchanged with each other through wired communication.

Controller 100 constituting game system 1 according to the present embodiment has an image pick-up portion 120 at one end. An attachment 300 can be attached to image pick-up portion 120 of controller 100. Details of attachment 300 will be described later.

Though controller 100 which communicates with main body 200 as shown in FIG. 1 is described as a typical example of the game controller in the description below, limitation thereto is not intended and any device having a function corresponding to image pick-up portion 120 can be employed as the game controller. For example, a portable game device itself including a display and an operation portion may be employed as a game controller, or a general-purpose portable terminal such as a portable telephone, a smartphone, or a tablet may be employed as the game controller.

(a2: Game Controller)

Figure 2:
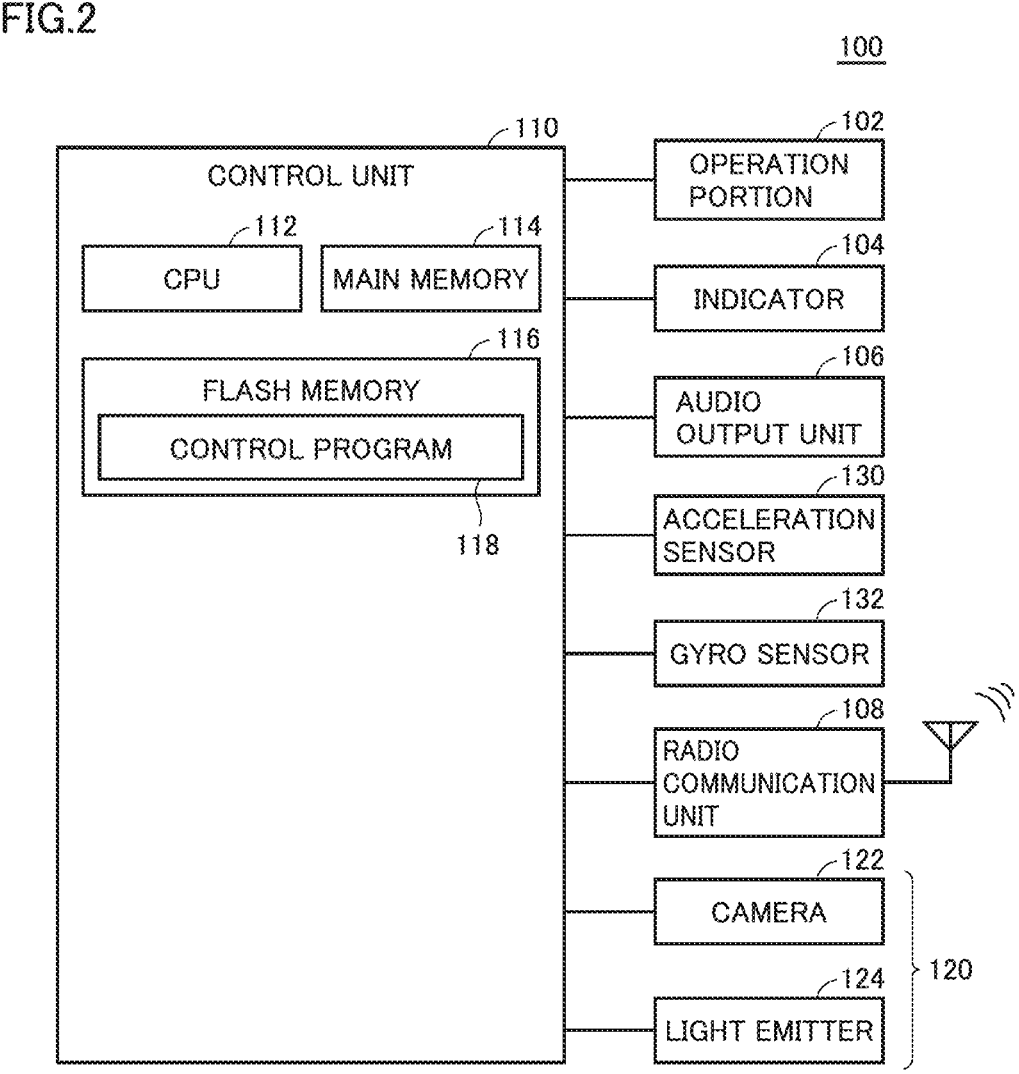
FIG. 2 shows an exemplary illustrative non-limiting drawing illustrating one example of a hardware configuration of a game controller shown in FIG. 1.

One example of a hardware configuration of game controller 100 shown in FIG. 1 will be described with reference to FIG. 2. Game controller 100 includes a control unit 110, an operation portion 102, an indicator 104, an audio output unit 106, a radio communication unit 108, an acceleration sensor 130, a gyro sensor 132, and image pick-up portion 120.

Control unit 110 is an entity which controls overall processing in controller 100 and includes as its main components, a central processing unit (CPU) 112, a main memory 114, and a flash memory 116 which stores a control program 118. CPU 112 representing one example of a processor implements various types of control as will be described later by reading control program 118 stored in flash memory 116 to main memory 114 and executing the control program.

Control unit 110 may be mounted as a system large scale integration (LSI) including the components described above.

Operation portion 102 accepts an operation by a user and outputs information representing a content of the operation by the user to control unit 110. Typically, operation portion 102 includes a push button, an operation lever, a touch panel, a mouse, and the like. Alternatively, a controller which is separate from controller 100 and connected through a wire or radio may be included as operation portion 102.

Indicator 104 is arranged as being exposed at a surface of controller 100 and gives a visual notification to a user in accordance with a command from control unit 110. Typically, indicator 104 includes a light emitting diode (LED) and the like.

Audio output unit 106 is arranged as being partially exposed at the surface of controller 100 and gives an auditory notification to a user in accordance with a command from control unit 110. Typically, audio output unit 106 includes one speaker or a plurality of speakers or the like.

Radio communication unit 108 exchanges a radio signal with another device in accordance with a command from control unit 110 and outputs data received from another device to control unit 110. Radio communication unit 108 includes a frequency generation circuit, a modulation circuit, a demodulation circuit, an encoding circuit, and the like which are not shown. Radio communication unit 108 may adopt a communication scheme in conformity with Bluetooth® under Institute of Electrical and Electronic Engineers (IEEE) 802.15 standards or wireless local area network (LAN) under IEEE 802.11 standards.

Acceleration sensor 130 detects an acceleration generated in controller 100 and outputs a result of detection to control unit 110. Gyro sensor 132 detects an inclination or the like of controller 100 and outputs a result of detection to control unit 110. At least one or both of acceleration sensor 130 and gyro sensor 132 can be used to detect at least one of an attitude and a motion of controller 100.

Image pick-up portion 120 is a portion which receives light around controller 100 and generates image data, and is constituted of a camera 122 and a light emitter 124.

Camera 122 includes any image pick-up device such as a charge coupled device (CCD), a complementary metal oxide semiconductor (CMOS) image sensor, and a photodiode array. Light reception sensitivity of camera 122 should only be set as appropriate in accordance with a wavelength of light emitted from a subject, and an image pick-up device having light reception sensitivity in an infrared region is employed in the present embodiment by way of example. In this case, camera 122 can output image data corresponding to an intensity distribution of incident infrared rays. An infrared camera may be adopted as camera 122.

Light emitter 124 is a light source for emitting light to a subject in order to shoot the subject with camera 122. By way of example, any light emitting device such as a light emitting diode (LED) or a laser diode can be employed as light emitter 124. As described above, when camera 122 obtains an image in an infrared region, light emitter 124 is preferably configured to emit infrared rays. Light emitter 124 can emit infrared (IR) rays to the subject. Light emitter 124 may also function similarly to a flash attached to a conventional camera.

(a3: Main Body)

Figure 3:
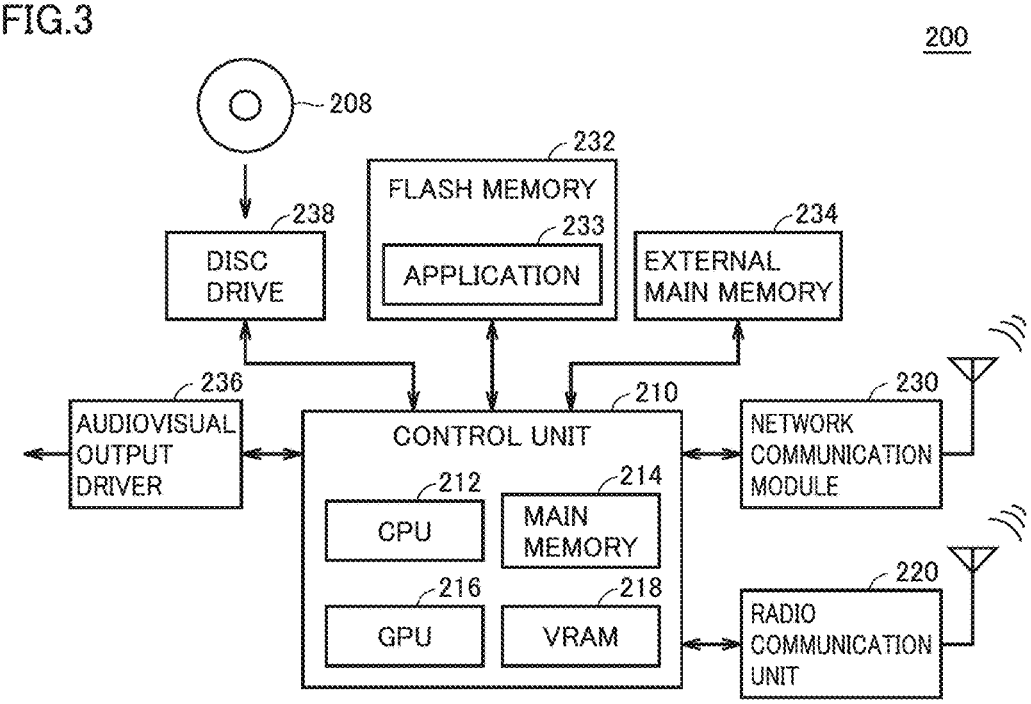
FIG. 3 shows an exemplary illustrative non-limiting drawing illustrating one example of a hardware configuration of a main body shown in FIG. 1.

One example of a hardware configuration of main body 200 shown in FIG. 1 will be described with reference to FIG. 3. Main body 200 represents one type of a computer and includes as its main components, a control unit 210, a radio communication unit 220, a network communication module 230, a flash memory 232, an external main memory 234, an audiovisual output driver 236, and a disc drive 238. Control unit 210 is an entity which controls overall processing in main body 200 and includes as its main components, a CPU 212, a main memory 214, a graphical processing unit (GPU) 216, and a video random access memory (VRAM) 218. CPU 212 executes a basic system program or an application. Main memory 214 functions as a working memory which temporarily holds data necessary for execution of a program by CPU 212. GPU 216 performs processing mainly involved with representation. VRAM 218 functions as a working memory for showing an image generated in processing by GPU 216.

Control unit 210 may be mounted as a system large scale integration (LSI) including the components described above.

Radio communication unit 220 exchanges a radio signal with another device in accordance with a command from control unit 210 and outputs data received from another device to control unit 210. Typically, radio communication unit 220 exchanges information with controller 100. A more specific configuration of radio communication unit 220 is similar to that of radio communication unit 108 of controller 100 shown in FIG. 2.

Network communication module 230 includes various circuits for radio communication with a device such as an access point. Network communication module 230 may be mounted, for example, by using local area network (LAN) under IEEE 802.11 standards, infrared communication, or mobile communication under long term evolution (LTE).

Since radio communication unit 220 and network communication module 230 both include a circuit for radio communication, they may be mounted on the same chip.

Flash memory 232 can be accessed from control unit 210 and holds a basic system program or an application in a non-volatile manner. For example, flash memory 232 may store various applications 233. Application 233 is read from an optical recording medium 208 by disc drive 238 and installed.

External main memory 234 may function as a working memory in coordination with main memory 214 in control unit 210.

Audiovisual output driver 236 outputs a video signal and an audio signal output from control unit 210 to display 204 (see FIG. 1).

<B. Overview of Attachment>

Overview of an attachment 300 which can be used in game system 1 according to the present embodiment will now be described. Attachment 300 is a member configured to allow various game operations, and it is basically constituted of a housing and an operation portion in the housing. The operation portion changes a position, a speed, an acceleration, an orientation, an angle, an attitude, and the like in accordance with an operation by a user.

As shown in FIG. 1, controller 100 is attached to attachment 300, change generated in the operation portion is detected based on an image obtained by shooting with image pick-up portion 120 (camera 122) of controller 100 (hereinafter also referred to as a "camera image"), and operation data is generated based on detected change. The operation portion has a movable portion in the housing, of which change in outer appearance is produced in accordance with an operation by a user onto the operation portion. Change in outer appearance is detected by shooting the movable portion and a content of an operation by the user is detected based on the detected change. Change in outer appearance includes, for example, change in position, shape, and pattern. A support portion which supports controller 100 is provided in the housing.

Attachment 300 should only be provided with a space to some extent in the inside. Therefore, a paper material such as a corrugated cardboard may be used for the housing, in addition to a metal material such as iron or aluminum or a resin material such as plastics.

Game system 1 according to the present embodiment can perform processing in each of controller 100 and main body 200. A series of processes such as generation of a camera image by shooting with camera 122 and generation of operation data from the camera image can be distributed between controller 100 and main body 200 or one of them can perform entire processing. Typically, manners as below are assumed:

(a) Implementation only with controller 100;

(b) Transmission of a camera image picked up by controller 100 to main body 200 and execution of substantial processes in main body 200; and (c) Execution of the processes in cooperation by controller 100 and main body 200.

One manner of execution in cooperation by controller 100 and main body 200 will be described below as a typical example. Any form of mounting, however, can be adopted depending on a configuration, processing capability, and required performance of the game system, without being limited to a processing procedure shown below.

Figure 4:
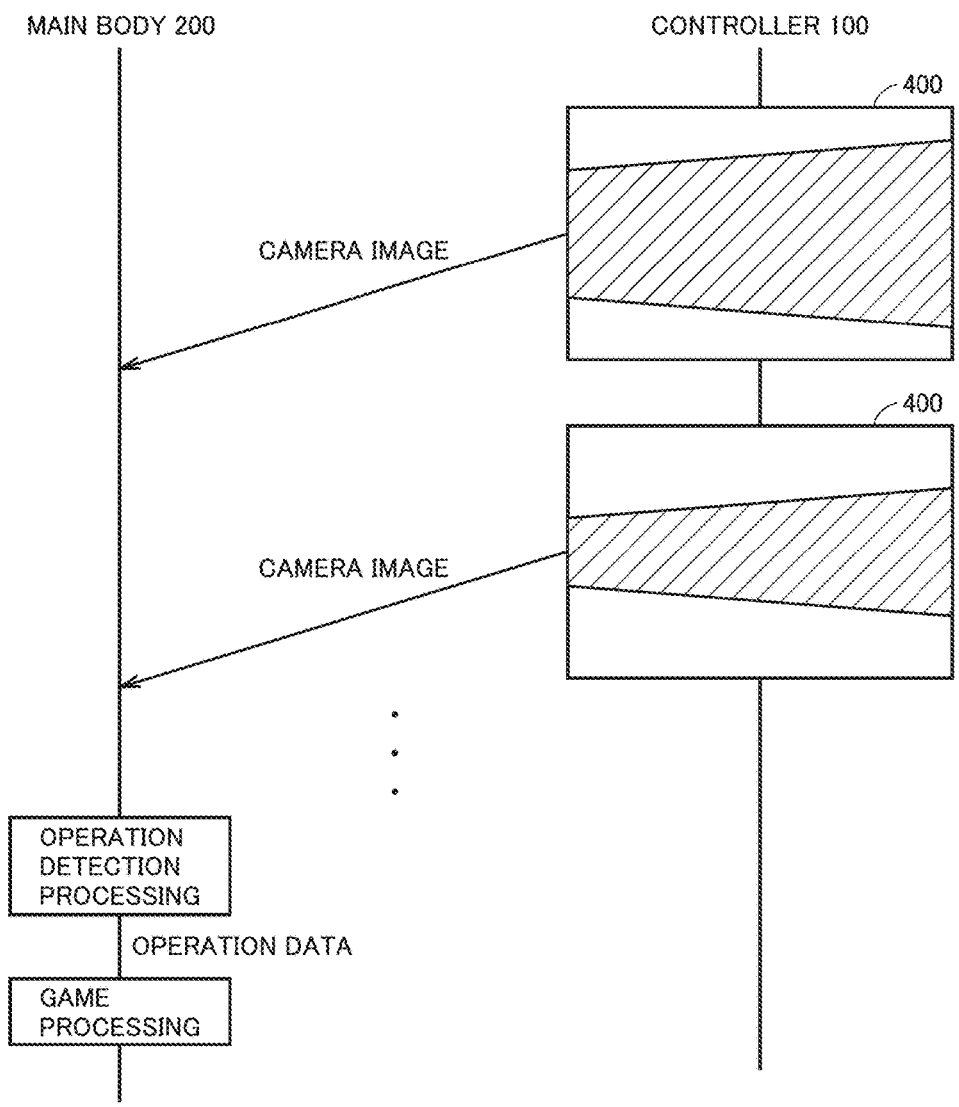
FIG. 4 shows an exemplary illustrative non-limiting drawing illustrating overview of processing in the game system according to the present embodiment.

Overview of processing in game system 1 according to the present embodiment will be described with reference to FIG. 4. A camera image 400 is obtained by shooting with camera 122 of controller 100. Controller 100 has a function to transmit image data obtained by shooting with camera 122 to main body 200, and camera image 400 obtained by controller 100 is transmitted to main body 200. Controller 100 has a transmission function to transmit image data of an infrared image obtained by shooting with camera 122 to main body 200. Shooting of camera image 400 and transmission thereof to main body 200 may be repeated with a constant period.

Main body 200 has an operation detection function to detect an operation onto the operation portion based on image data. More specifically, main body 200 performs processing for detecting change in outer appearance of the movable portion generated in camera image 400 onto camera image 400 from controller 100 and detects an operation by the user onto the operation portion of attachment 300 (operation detection processing).

Main body 200 has a game processing execution function to perform corresponding game processing based on an operation detected with the operation detection function. More specifically, main body 200 generates operation data representing a content of the detected operation by the user and proceeds with game processing based on the generated operation data.

Main body 200 performs different game processing depending on a type of attached attachment 300. Specifically, different operation data may be generated depending on a type of specified attachment 300, and different game processing may be performed on the same operation data depending on a type of specified attachment 300.

Thus, attachment 300 according to the present embodiment functions as a kind of a game controller or an input device which detects any operation by the user by being attached to controller 100 with camera 122.

Some specific examples of the attachment which can be used in game system 1 according to the present embodiment will be described below.

<C. Attachment According to First Embodiment>

An attachment 300A in which a pressing operation and a rotation operation can be performed will initially be described as a first embodiment.

Figure 5:
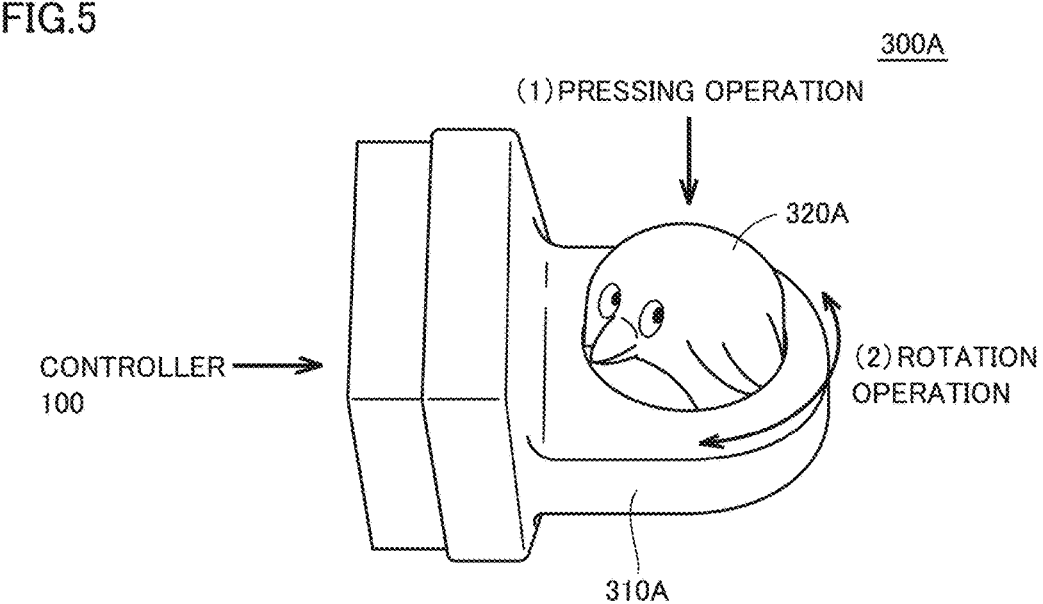
FIG. 5 shows an exemplary illustrative non-limiting drawing illustrating appearance of an attachment according to a first embodiment.

Appearance of attachment 300A according to the first embodiment will be described with reference to FIG. 5. Attachment 300A has a housing 310A which can be connected to controller 100. A part of a spherical operation portion 320A which is abstracted from a bird is rotatably engaged with an opening in housing 310A. A user can perform an operation to press operation portion 320A (a pressing operation) and an operation to rotate operation portion 320A (a rotation operation). Attachment 300A includes a button mechanism and a rotation mechanism. A configuration provided with only one of the pressing mechanism and the rotation mechanism may be adopted.

Figure 6A:
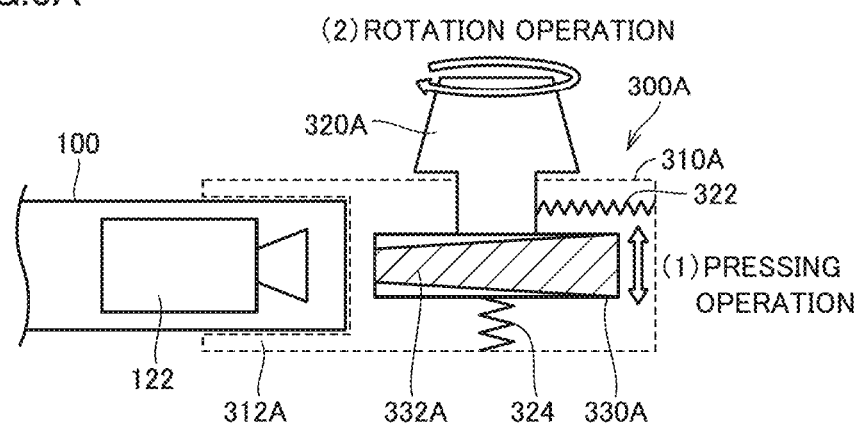
FIGS. 6A and 6B show exemplary illustrative non-limiting drawings illustrating a structure for detecting an operation by a user onto the attachment shown in FIG. 5.
Figure 6B:
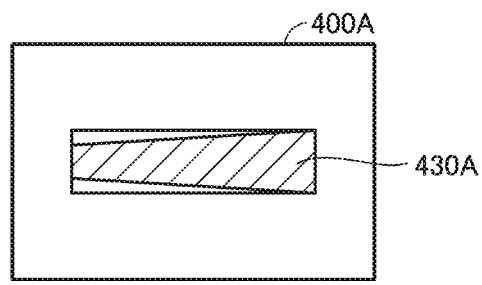

A structure for detecting an operation by the user onto attachment 300A shown in FIG. 5 will be described with reference to FIGS. 6A and 6B. FIG. 6A shows one example of a cross-sectional structure of attachment 300A shown in FIG. 5. FIG. 6A exemplifies a state that controller 100 is attached.

Referring to FIG. 6A, an opening is provided at one end of attachment 300A and controller 100 is attached to the opening. Coupling between controller 100 and attachment 300A may be fine or coarse. In attachment, a support portion 312A formed in a part of housing 310A of attachment 300A supports controller 100. Any structure of support portion 312A may be adopted so long as the structure can support controller 100 such that a direction of shooting of camera 122 of controller 100 is oriented to the inside of housing 310A. Support portion 312A is preferably constructed to be in a shape in conformity with a shape of a housing 310 of attachment 300.

As controller 100 is positioned by support portion 312A of housing 310A, a member located in housing 310A is included as a subject in a field of view of shooting with camera 122 of controller 100. Operation portion 320A has a cylindrical portion 330A as a movable portion arranged at a position in housing 310A, of which position is changed by an operation onto operation portion 320A. Cylindrical portion 330A is arranged such that at least a part thereof is located within the field of view of shooting with camera 122 of controller 100. When the user operates operation portion 320A, cylindrical portion 330A integrally formed with operation portion 320A is also moved in coordination. Therefore, when viewed from camera 122, change in outer appearance occurs in an outer circumferential surface of cylindrical portion 330A.

Thus, cylindrical portion 330A is seen as a subject in a camera image 400A obtained by shooting with camera 122. By detecting a region corresponding to cylindrical portion 330A in camera image 400A, the operation by the user onto operation portion 320A can be detected. The rotation operation and/or the pressing operation performed onto operation portion 320A by the user can independently be detected from the camera image obtained by shooting with camera 122 of controller 100.

As shown in FIG. 6A, a biasing mechanism such as a latch mechanism 322 for generating force against an operation by the user to rotate operation portion 320A (a rotation operation) and/or a biasing mechanism such as a spring 324 for generating force against an operation by the user to press operation portion 320A (a pressing operation) may be adopted.

By adopting latch mechanism 322, what is called "clicking" feeling can be obtained in rotation of operation portion 320A by the user. By adopting spring 324, such movement of a button as movement of operation portion 320A downward only while the user presses the button can be realized. By thus adding the biasing mechanism against an operation onto operation portion 320A to attachment 300A, a controller which can give intuitive and physical feedback to the user can be implemented.

In the configuration example shown in FIGS. 6A and 6B, a region (hereinafter also referred to as a "marker") 332A for producing change in outer appearance in accordance with an operation by the user onto operation portion 320A is formed on an outer circumferential surface of cylindrical portion 330A. A marker in a wedge shape of which width is varied along a position in a circumferential direction is adopted as marker 332A shown in FIGS. 6A and 6B. Typically, marker 332A is made of a material different in reflectance from other regions of cylindrical portion 330A. Since camera 122 of controller 100 generates a camera image corresponding to intensity of reflected IR rays, marker 332A and a region other than the marker in cylindrical portion 330A are configured to be different from each other in reflectance to IR rays. Reflectances of marker 332A and a region other than the marker may be set to any value so long as they are set to values different from each other.

By way of example, a reflectance of marker 332A may be set to be higher and a reflectance of the region other than the marker may be set to be lower. In other words, marker 332A may be made of a "white" material and the region other than the marker may be made of a "black" material or a material making up cylindrical portion 330A itself. Any reflective material can be employed as the "white" material. A retro-reflective material is more preferred as the reflective material. A generally commercially available material can be employed as the retro-reflective material, or a material for a highlighter or the like may be made use of As shown in FIG. 6B, camera image 400A obtained by shooting with camera 122 of controller 100 includes a subject image 430A corresponding to cylindrical portion 330A located in housing 300A. An operation by the user is detected based on a result of detection of change in outer appearance in subject image 430A.

Figure 7A:
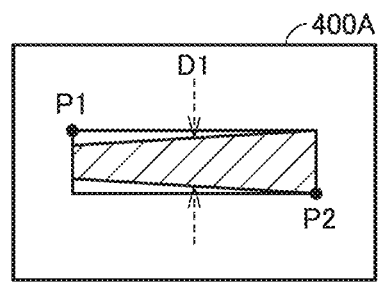
FIGS. 7A to 7C show exemplary illustrative non-limiting drawings illustrating a method of detecting an operation by the user onto the attachment shown in FIGS. 6A and 6B.

A method of detecting an operation by the user onto attachment 300A shown in FIGS. 6A and 6B will be described with reference to FIGS. 7A to 7C. FIG. 7A shows one example of camera image 400A shot in an initial state in which no operation by the user has been performed onto operation portion 320A. Processing for searching camera image 400A for a pattern corresponding to marker 332A is performed. In the processing for searching for a pattern, typically, processing for specifying a portion different in color from other regions included in camera image 400A (which is a set of pixels and also referred to as a "cluster") is used. In the processing for searching for a cluster, a position of the center of gravity of a cluster, a size of a cluster, and a region containing a cluster (typically, an upper left coordinate and a lower right coordinate of the region) are detected from input camera image 400A.

FIG. 7A shows an example in which an upper left coordinate P1 and a lower right coordinate P2 of a rectangular region which contains a pattern corresponding to marker 332A are detected. Then, for example, processing for detecting a width (a thickness in a vertical direction) at a laterally central portion of camera image 400A, of a pattern corresponding to marker 332A is performed. FIG. 7A shows an example of detection of a width D1 of the pattern corresponding to marker 332A.

Figure 7B:
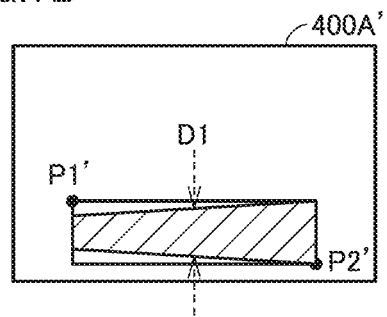

FIG. 7B shows one example of a camera image 400A' shot while a pressing operation is performed onto operation portion 320A. It is assumed that processing similar to that for camera image 400A shown in FIG. 7A is also performed on camera image 400A' and an upper left coordinate P1' and a lower right coordinate P2' of the rectangular region containing the pattern corresponding to marker 332A are detected. The pressing operation onto operation portion 320A can be detected based on such change from upper left coordinate P1 to upper left coordinate P1' and/or change from lower right coordinate P2 to lower right coordinate P2'.

Figure 7C:
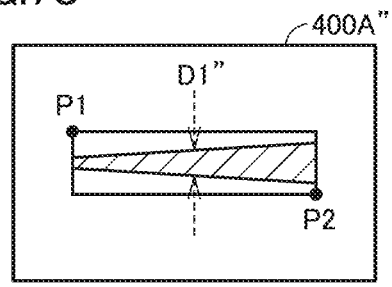

FIG. 7C shows one example of a camera image 400A" shot while a rotation operation onto operation portion 320A is performed. It is assumed that processing similar to that for camera image 400A shown in FIG. 7A is also performed on camera image 400A" and a width D1" of the pattern corresponding to marker 332A is detected. The rotation operation onto operation portion 320A can be detected based on such change from width D1 to width D1".

As shown in FIGS. 7A and 7B, a position of cylindrical portion 330A as the movable portion is changed in accordance with a pressing operation onto operation portion 320A. As shown in FIGS. 7A and 7C, at least one of a shape and a pattern viewed from camera 122 of/on cylindrical portion 330A as the movable portion is changed in accordance with a rotation operation onto operation portion 320A. At least one of a shape of and a pattern on cylindrical portion 330A as the movable portion is gradually changed with rotation along a direction substantially in parallel to a direction of the pressing operation onto operation portion 320A. As shown in FIGS. 7A to 7C, a width of cylindrical portion 330A as the movable portion may be changed with the rotation operation.

At least one of a shape of and a pattern on cylindrical portion 330A may gradually be changed with rotation along a direction substantially perpendicular to the direction of the pressing operation onto operation portion 320A. In this case, a structure or the like of cylindrical portion 330A is also in accordance with rotation along the direction substantially perpendicular to the direction of the pressing operation.

Detection of the rotation operation does not have to be based on a width of the pattern corresponding to marker 332A, and a luminance (for example, a total sum or an average value of luminance values of pixels constituting the pattern) of the pattern corresponding to marker 332A or a position of the pattern corresponding to marker 332A may be made use of.

A processing procedure for detecting an operation by the user onto attachment 300A according to the first embodiment will be described with reference to FIG. 8. Each step shown in FIG. 8 is performed by execution of control program 118 by CPU 112 of control unit 110 of controller 100 (see FIG. 2 for all of these elements) or execution of application 233 by CPU 212 of control unit 210 of main body 200 (see FIG. 2 for all of these elements).

Camera image 400A is obtained by shooting the inside of attachment 300A with camera 122 of controller 100 (step S100). Processing for searching obtained camera image 400A for a cluster is performed (step S102). Whether or not the cluster has successfully been found is determined (step S104), and when the cluster has not been found (NO in step S104), processing in step S100 or later is repeated.

When the cluster has successfully been found (YES in step S104), whether or not a pressing operation has been performed is determined based on a coordinate of a region containing the found cluster (step S106). When the coordinate of the detected region is located under a reference position, it is determined that the pressing operation has been performed. Otherwise, it is determined that the pressing operation has not been performed.

In succession, a width (a thickness in the vertical direction) of the found cluster at the laterally central portion is calculated (step S108), and whether or not a rotation operation has been performed or a degree of the rotation operation is determined based on the calculated width (step S110). Displacement in amount of rotation from a previous state is calculated based on a difference between the width calculated in the previous processing and the width calculated in the present processing, or a position resulting from rotation is determined based on a ratio between the calculated width and a predetermined reference width.

Then, operation data including whether or not a pressing operation has been sensed in step S106 and whether or not a rotation operation has been performed or a degree of the rotation operation determined in step S110 is generated (step S112). Then, processing in step S100 or later is repeated.

Some modifications of the marker provided to the movable portion of the operation portion of attachment 300A according to the first embodiment will be described with reference to FIGS. 9A to 9C.

Figure 9A:
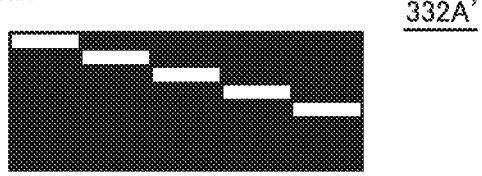
FIGS. 9A to 9C show exemplary illustrative non-limiting drawings illustrating some modifications of a marker provided to a movable portion of an operation portion of the attachment according to the first embodiment.

A marker 332A' shown in FIG. 9A exhibits such a pattern that a position of a hollow portion is varied stepwise along a circumferential surface of cylindrical portion 330A. A pressing operation and a rotation operation can independently be detected by sequentially detecting the position of the hollow portion of marker 332A'.

Figure 9B:
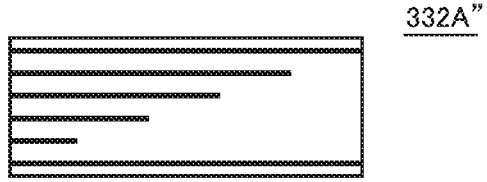

A marker 332A" shown in FIG. 9B is such that a plurality of lines different in length extend along the circumferential surface of cylindrical portion 330A and the number of lines intersecting with a line extending in an axial direction of cylindrical portion 330A is different at each position (each angle) on the circumferential surface. A pressing operation and a rotation operation can independently be detected based on how many lines as marker 332A" can visually be recognized at each position on the circumferential surface of cylindrical portion 330A.

Figure 9C:
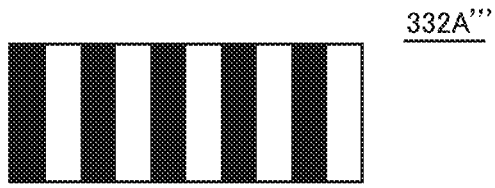

A marker 332A''' shown in FIG. 9C exhibits such a pattern that hollow portions and black portions are alternately arranged along the circumferential surface of cylindrical portion 330A. A pressing operation can be detected based on how much height (a width in an up-down direction) of white and black regions as marker 332A''' can visually be recognized by monitoring the circumferential surface of cylindrical portion 330A and a rotation operation can be detected based on the number of times of change between white and black.

Figure 10A:
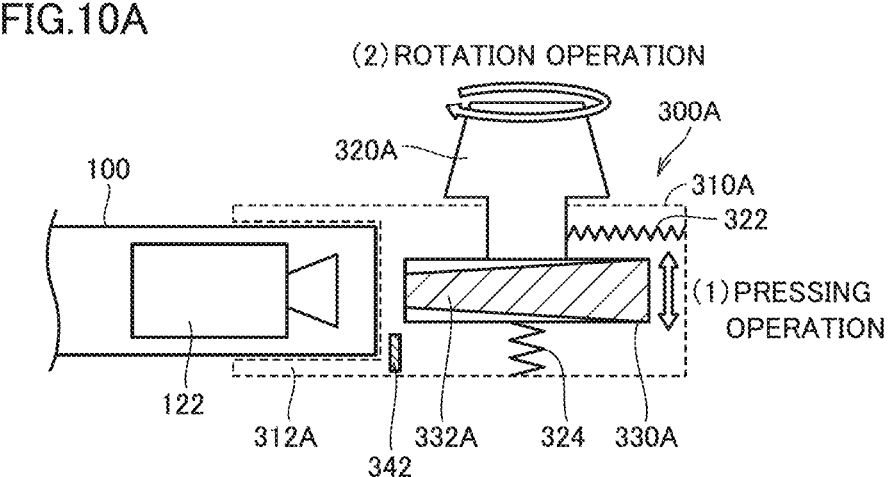
FIGS. 10A and 10B show exemplary illustrative non-limiting drawings illustrating examples of a structure which enhances accuracy in detection of a pressing operation onto the attachment according to the first embodiment.

One example of a structure enhancing accuracy in detection of a pressing operation onto attachment 300A according to the first embodiment will be described with reference to FIGS. 10A and 10B. FIG. 10A shows a configuration example in which a shield member is employed and FIG. 10B shows a configuration example in which a reflection member is employed.

Referring to FIG. 10A, a shield member 342 is further arranged in a direction of shooting of camera 122 in front of cylindrical portion 330A as the movable portion and on a side toward which cylindrical portion 330A is pressed. When a pressing operation is performed onto operation portion 320A, shield member 342 covers marker 332A arranged on a side surface of cylindrical portion 330A and the pressing operation can more reliably be detected.

Figure 10B:
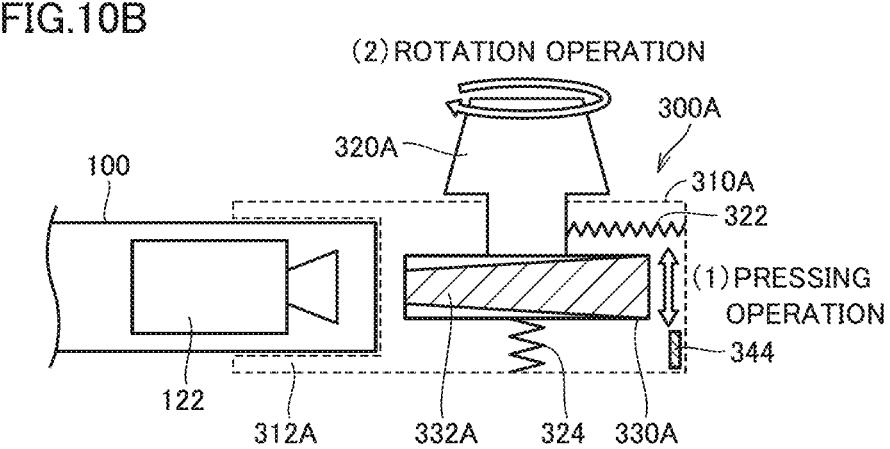

Referring to FIG. 10B, a reflection member 344 is further arranged in the direction of shooting of camera 122 in the rear of cylindrical portion 330A as the movable portion and on the side toward which cylindrical portion 330A is pressed. When the pressing operation is performed onto operation portion 320A, reflection member 344 is covered with cylindrical portion 330A and the pressing operation can more reliably be detected.

As described above, in the first embodiment, an operation by the user (a pressing operation and a rotation operation) onto operation portion 320A can independently be detected by detecting a marker arranged in cylindrical portion 330A with camera 122.

<D. Attachment According to First Modification of First Embodiment>

Though a pressing operation and a rotation operation can be performed in attachment 300A according to the first embodiment described above, a slide operation can further be performed.

Appearance of an attachment 300B according to a first modification of the first embodiment will be described with reference to FIG. 11. Attachment 300B corresponds to attachment 300A shown in FIG. 5 to which a mechanism for a slide operation is added.

Specifically, attachment 300B has a housing 310B which can be connected to controller 100. A part of a spherical operation portion 320B which is abstracted from a bird is rotatably engaged with an opening in housing 310B. A user can perform an operation to press operation portion 320B (a pressing operation) and an operation to rotate operation portion 320B (a rotation operation). Furthermore, in attachment 300B, an operation portion 340B is slidably attached to housing 310B. The user can perform a slide operation to move operation portion 340B in the up-down direction in the drawing. Operation portion 340B corresponds to a slide mechanism which is slid in a direction substantially perpendicular to a direction of shooting of camera 122.

Figure 12A:
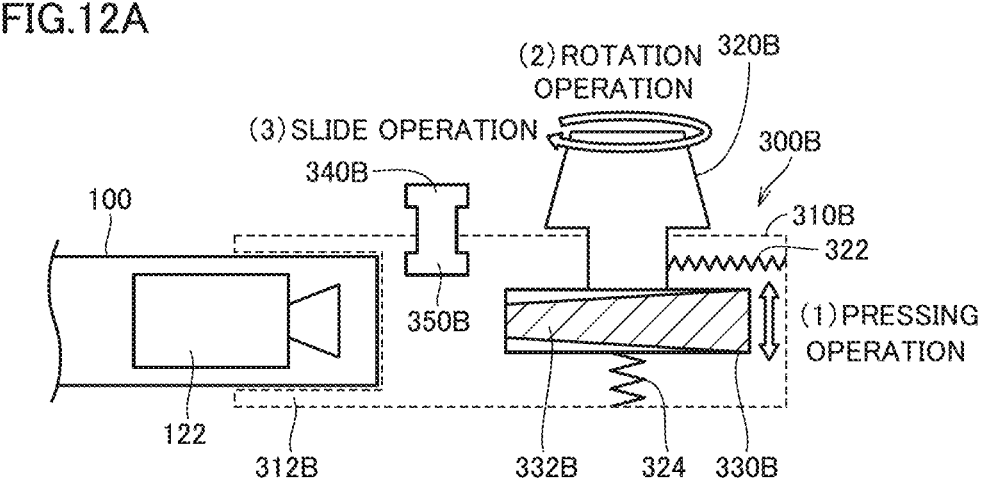
FIGS. 12A and 12B show exemplary illustrative non-limiting drawings illustrating a structure for detecting an operation by the user onto the attachment shown in FIG. 11.

A structure for detecting an operation by the user onto attachment 300B shown in FIG. 11 will be described with reference to FIGS. 12A and 12B. FIG. 12A shows one example of a cross-sectional structure of attachment 300B shown in FIG. 11. Referring to FIG. 12A, an opening is provided at one end of attachment 300B, and in attachment, a support portion 312B formed in a part of housing 310B of attachment 300B supports controller 100. Operation portion 320B has a cylindrical portion 330B as the movable portion arranged at a position in housing 310B, of which position is changed in accordance with an operation onto operation portion 320B. Since cylindrical portion 330B formed integrally with operation portion 320B is also moved in coordination with an operation of operation portion 320B by the user, when viewed from camera 122, change in outer appearance is produced in an outer circumferential surface of cylindrical portion 330B.

Operation portion 340B has a movable portion 350B arranged at a position in housing 310B, of which position is changed in accordance with an operation onto operation portion 340B. Since movable portion 350B formed integrally with operation portion 340B is also moved in coordination with an operation of operation portion 340B by the user, when viewed from camera 122, a position of movable portion 350B is changed.

Figure 12B:
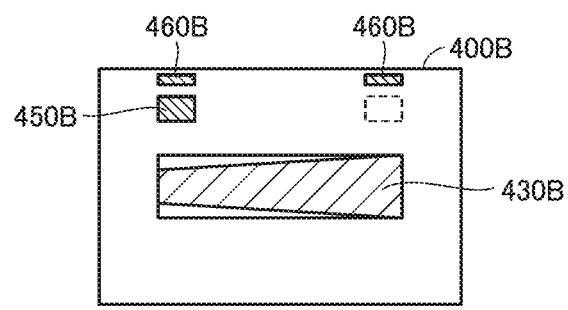

As shown in FIG. 12B, a camera image 400B obtained by shooting with camera 122 of controller 100 includes a subject image 430B corresponding to cylindrical portion 330B located in housing 300B. A pressing operation and a rotation operation are detected based on a result of detection of change in outer appearance in subject image 430B. Since a method of detecting a pressing operation and a rotation operation is the same as in the first embodiment described above, detailed description will not be repeated.

Camera image 400B includes a subject image 450B corresponding to movable portion 350B located in housing 300B. A slide operation is detected based on a result of detection of change in position of subject image 450B. When a user performs a slide operation onto operation portion 340B, a position of subject image 450B included in camera image 400B is also changed and hence an amount of slide with respect to operation portion 340B can be detected based on change in position of subject image 450B. As shown in FIG. 12B, a position of movable portion 350B is changed in accordance with a slide operation onto operation portion 340B.

A reflective material is preferably arranged on a surface of movable portion 350B such that subject image 450B included in camera image 400B more clearly appears. A retro-reflective material is more preferred as the reflective material.

In order to detect each end of the slide operation onto operation portion 340B, a reference marker is preferably arranged in advance at a proper position in housing 310B. With such a reference marker, camera image 400B includes a reference image 460B showing the reference marker and an amount of slide can be calculated with reference image 460B being defined as a reference position.

For detection of a slide operation, change in size of subject image 450B or the like may be made use of, without being limited to change in position of subject image 450B.

Since the modification is otherwise the same as the first embodiment, detailed description will not be repeated. In the first modification of the first embodiment, an operation by the user onto operation portion 320B (a pressing operation and a rotation operation) and an operation by the user onto operation portion 340B (a slide operation) can independently be detected by shooting the inside of housing 310B of attachment 300B with camera 122.

<E. Attachment According to Second Modification of First Embodiment>

Though a pressing operation and a rotation operation can be performed in attachment 300A according to the first embodiment described above, a configuration adapted only to a rotation operation may be adopted.

Appearance of an attachment 300C according to a second modification of the first embodiment will be described with reference to FIG. 13. Attachment 300C has appearance in the motif of a reel for fishing. Specifically, attachment 300C has a housing 310C which can be connected to controller 100. An operation portion 320C simulating a handle of the reel for fishing is arranged as being rotatable with respect to housing 310C. A user can perform an operation to rotate operation portion 320C (a rotation operation).

The rotation operation performed by the user onto operation portion 320C can be detected with the method the same as in the first embodiment or the first modification thereof described above. Since the modification is otherwise the same as the first embodiment, detailed description will not be repeated. In the second modification of the first embodiment, the user can play a game associated with fishing or the like by operating attachment 300C simulating the reel, and reality can be given to the user.

<F. Attachment According to Second Embodiment>

An attachment 300D in which a rotation operation and a slide operation can be performed will now be described as a second embodiment.

Figure 14:
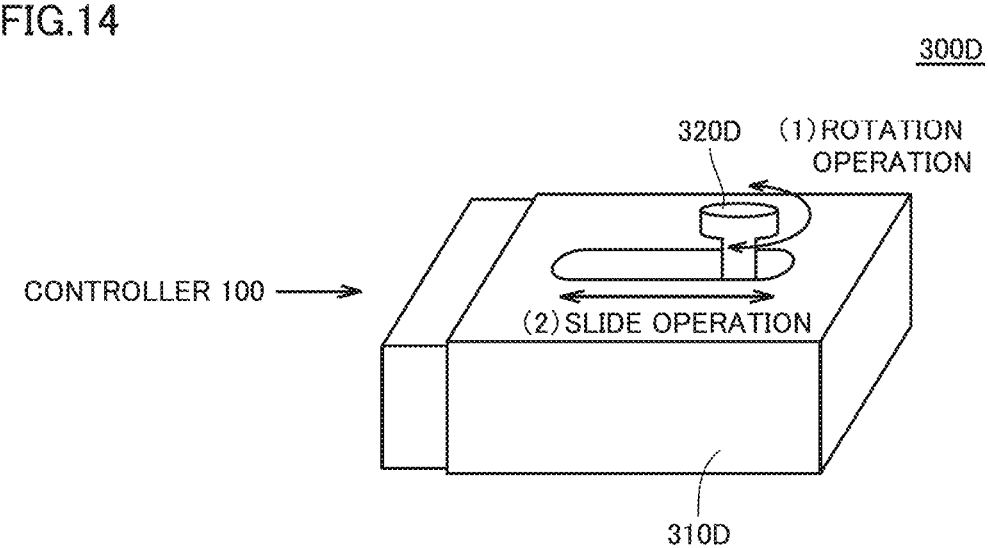
FIG. 14 shows an exemplary illustrative non-limiting drawing illustrating appearance of an attachment according to a second embodiment.

Appearance of attachment 300D according to the second embodiment will be described with reference to FIG. 14. Attachment 300D has a housing 310D which can be connected to controller 100. An operation portion 320D structured such that two cylinders different in shaft diameter are stacked is arranged as being slidable with respect to housing 310D. Operation portion 320D can also be rotated around the shaft. By adopting such a construction, a user can perform an operation to rotate operation portion 320D (a rotation operation) and an operation to slide operation portion 320D (a slide operation). Operation portion 320D corresponds to a slide mechanism slid in a direction substantially in parallel to a direction of shooting of camera 122. Attachment 300D thus includes a rotation mechanism and a slide mechanism. A construction provided with only any one of the rotation mechanism and the slide mechanism may be adopted.

Figure 15A:
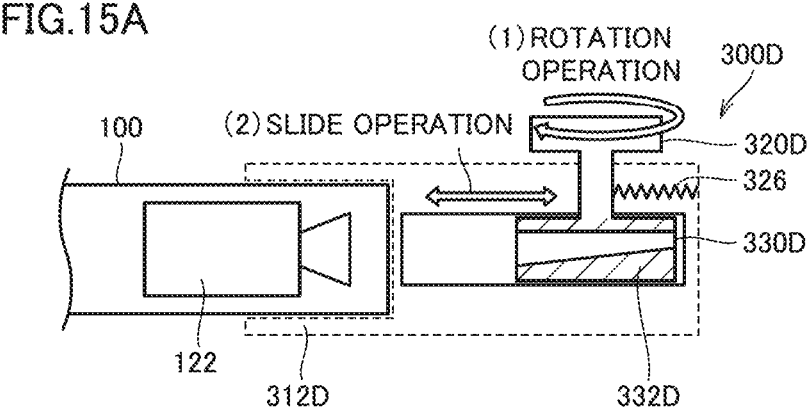
FIGS. 15A and 15B show exemplary illustrative non-limiting drawings illustrating a structure for detecting an operation by the user onto the attachment shown in FIG. 14.

A structure for detecting an operation by the user onto attachment 300D shown in FIG. 14 will be described with reference to FIGS. 15A and 15B. FIG. 15A shows one example of a cross-sectional structure of attachment 300D shown in FIG. 14. Referring to FIG. 15A, an opening is provided at one end of attachment 300D, and in attachment, a support portion 312D formed in a part of housing 310D of attachment 300D supports controller 100.

Operation portion 320D has a cylindrical portion 330D as the movable portion arranged at a position in housing 310D, of which position is changed in accordance with an operation onto operation portion 320D. Since cylindrical portion 330D formed integrally with operation portion 320D is also moved in coordination with an operation of operation portion 320D by the user, when viewed from camera 122, change in outer appearance is produced in an outer circumferential surface of cylindrical portion 330D.

As shown in FIG. 15A, a biasing mechanism such as a spring 326 for generating force against an operation to slide operation portion 320D by the user (the slide operation) may be adopted. By adopting spring 326, a motion of the slide mechanism such as movement of operation portion 320D to the left in the drawing only while the user performs the slide operation can be realized. By thus adding the biasing mechanism against the operation onto operation portion 320D to attachment 300D, a controller which can give intuitive and physical feedback to the user can be implemented.

Figure 15B:
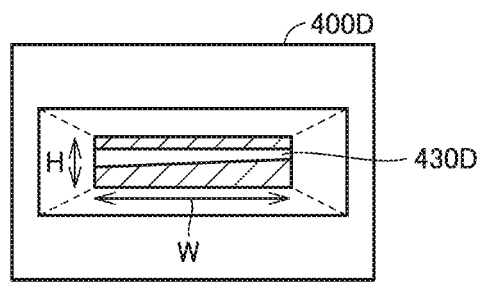

In the configuration example shown in FIGS. 15A and 15B, a region (a marker) 332D for producing change in outer appearance in accordance with an operation by the user onto operation portion 320D is formed on an outer circumferential surface of cylindrical portion 330D. A marker which is combination of a portion having a constant width at any position in a circumferential direction and a tapered portion having a width varying along a position in the circumferential direction is adopted as marker 332D shown in FIGS. 15A and 15B. Marker 332D is made of a material different in reflectance from other regions in cylindrical portion 330D. Typically, a pattern of marker 332D is formed by using a reflective material. A retro-reflective material is more preferred as the reflective material. Marker 332D should only be configured similarly to marker 332A of attachment 300A according to the first embodiment, and similar description will not be repeated here.

As shown in FIG. 15B, a camera image 400D obtained by shooting with camera 122 of controller 100 includes a subject image 430D corresponding to cylindrical portion 330D located in housing 300D. An operation by the user is detected based on a result of detection of change in outer appearance in subject image 430D.

Figure 16A:
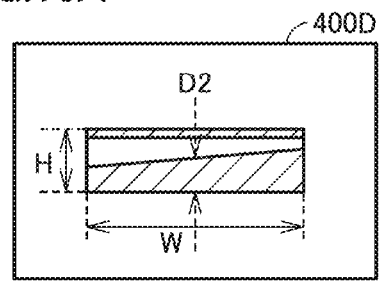
FIGS. 16A to 16C show exemplary illustrative non-limiting drawings illustrating a method of detecting an operation by the user onto the attachment shown in FIGS. 15A and 15B.

A method of detecting an operation by the user onto attachment 300D shown in FIGS. 15A and 15B will be described with reference to FIGS. 16A to 16C. FIG. 16A shows one example of camera image 400D shot in an initial state in which no operation by the user has been performed onto operation portion 320D. Processing for searching camera image 400D for a pattern corresponding to marker 332D is performed. The processing for searching for a cluster as described above is used for the processing for searching for a pattern.

FIG. 16A shows an example in which a lateral width W and a vertical width H of a rectangular region containing a pattern corresponding to marker 332D are detected. Then, processing for detecting a width (a thickness in the vertical direction) at a laterally central portion of camera image 400D, of a pattern corresponding to the tapered shape of marker 332D is performed. FIG. 16A shows an example in which a width D2 of the pattern corresponding to marker 332D is detected.

Figure 16B:
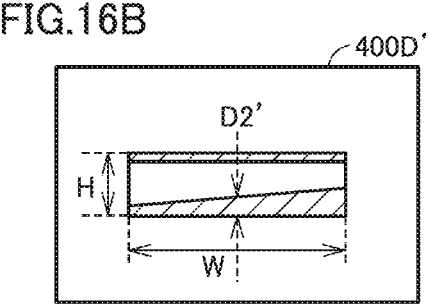

FIG. 16B shows one example of a camera image 400D' shot with a rotation operation onto operation portion 320D having been performed. Processing similar to the processing for camera image 400D shown in FIG. 16A is performed also for camera image 400D', to thereby detect lateral width W and vertical width H of the rectangular region containing the pattern corresponding to marker 332D and detect a width D2' of the pattern corresponding to marker 332D. A rotation operation onto operation portion 320D can be detected based on such change from width D2 to width D2'.

Figure 16C:
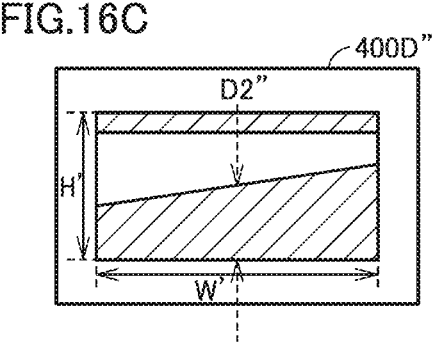

Detection of the rotation operation does not have to be based on a size of the rectangular region containing the pattern corresponding to marker 332D, and a luminance of the pattern corresponding to marker 332D (for example, a total sum or an average value of luminance values of pixels constituting the pattern) or a position of the pattern corresponding to marker 332D may be made use of FIG. 16C shows one example of a camera image 400D" shot with a slide operation onto operation portion 320D having been performed. The processing similar to that for camera image 400D shown in FIG. 16A is performed also for camera image 400" to thereby detect a lateral width W' and a vertical width H' of the rectangular region containing the pattern corresponding to marker 332D and detect a width D2" of the pattern corresponding to marker 332D. The slide operation onto operation portion 320D can be detected based on such detected change in area (change from lateral width W×vertical width H to lateral width W'×vertical width H') of the rectangular region. Since a distance between camera 122 of controller 100 and cylindrical portion 330D is changed as a result of the slide operation onto operation portion 320D, change in distance can be detected by using a size of the pattern in the shot camera image.

Detection of the slide operation does not have to be based on a size of the pattern corresponding to marker 332D, and change in position of the pattern corresponding to marker 332D may be made use of.

In connection with change from width D2 to width D2", whether or not a rotation operation has been performed onto operation portion 320D is determined in consideration of change in area of the rectangular region. Change from width D2 to width D2" is corrected in accordance with detected change in area of the rectangular region.

For a slide operation onto operation portion 320D, instead of detected change in area of the rectangular region, change in a lateral width (change from lateral width W to lateral width W'), change in a vertical width (change from vertical width H to vertical width H'), or brightness of the camera as a whole (for example, a total sum or an average value of luminance values of all pixels) may be made use of At least one of a shape of and a pattern on cylindrical portion 330D as the movable portion viewed from camera 122 is changed in accordance with a rotation operation onto operation portion 320D as shown in FIGS. 16A and 16B. As shown in FIGS. 16A and 16C, a position of cylindrical portion 330D as the movable portion is changed in accordance with a slide operation onto operation portion 320D.

Though FIGS. 16A to 16C exemplify a configuration in which a rotation operation and a slide operation can independently be detected by using marker 332D which is combination of the tapered pattern and the pattern constant in width, limitation thereto is not intended. For example, a slide operation may be detected by using marker 332D only having the tapered pattern based on change in lateral width of the tapered pattern. Alternatively, in addition to the tapered pattern for detecting a rotation operation, a marker defined as a reference of a size for detecting a slide operation (for example, a marker having a circular pattern) may separately be arranged and a degree of the slide operation may be detected based on the separately arranged marker.

A processing procedure for detecting an operation by the user onto attachment 300D according to the second embodiment will be described with reference to FIG. 17. Each step shown in FIG. 17 is performed by execution of control program 118 by CPU 112 of control unit 110 of controller 100 (see FIG. 2 for all of these elements) or execution of application 233 by CPU 212 of control unit 210 of main body 200 (see FIG. 2 for all of these elements).

Referring to FIG. 17, camera image 400D is obtained by shooting the inside of attachment 300D with camera 122 of controller 100 (step S200). Processing for searching obtained camera image 400D for a cluster is performed (step S202). Whether or not the cluster has successfully been found is determined (step S204), and when the cluster has not been found (NO in step S204), processing in step 5200 or later is repeated.

When the cluster has successfully been found (YES in step S204), whether or not a slide operation has been performed and a degree of the slide operation are determined based on a lateral width and a vertical width of the rectangular region containing the found cluster (step S206). When a ratio between an area calculated from the detected lateral width and vertical width of the rectangular region and a reference area is greater than 1, it is determined that the slide operation has been performed and magnitude of the slide operation is calculated based on the ratio.

In succession, a width (a thickness in the vertical direction) at the laterally central portion, of a lower portion of the found cluster (a pattern corresponding to the tapered portion) is calculated (step S208), and whether or not a rotation operation has been performed or a degree of the rotation operation is determined based on the calculated width and the area calculated in step S206 (step S210). The width calculated based on the area calculated in step S206 is corrected, and then displacement in amount of rotation from a previous state is calculated based on a difference between the width calculated in the previous processing and the corrected width, or a position resulting from rotation is determined based on a ratio between the corrected width and a predetermined reference width.

Then, operation data including whether or not the slide operation has been sensed in step S206 or a degree of the slide operation and whether or not the rotation operation has been performed or a degree of the rotation operation determined in step S210 is generated (step S212). Then, processing in step S200 or later is repeated. Since the embodiment is otherwise the same as the first embodiment, detailed description will not be repeated. In the second embodiment, an operation by the user onto operation portion 320D (a rotation operation and a slide operation) can independently be detected by shooting the inside of housing 310D of attachment 300D with camera 122.

<G. Attachment According to First Modification of Second Embodiment>

Though a rotation operation and a slide operation can be performed in attachment 300D according to the second embodiment described above, instead of the slide operation, one may be able to perform a pulling operation associated with the slide operation. For the pulling operation, a mechanism for an operation as a pusher of a pinball, such as returning to an original position after a user pulls out the operation portion and releases his/her hand from the operation portion, is assumed.

Figure 18:
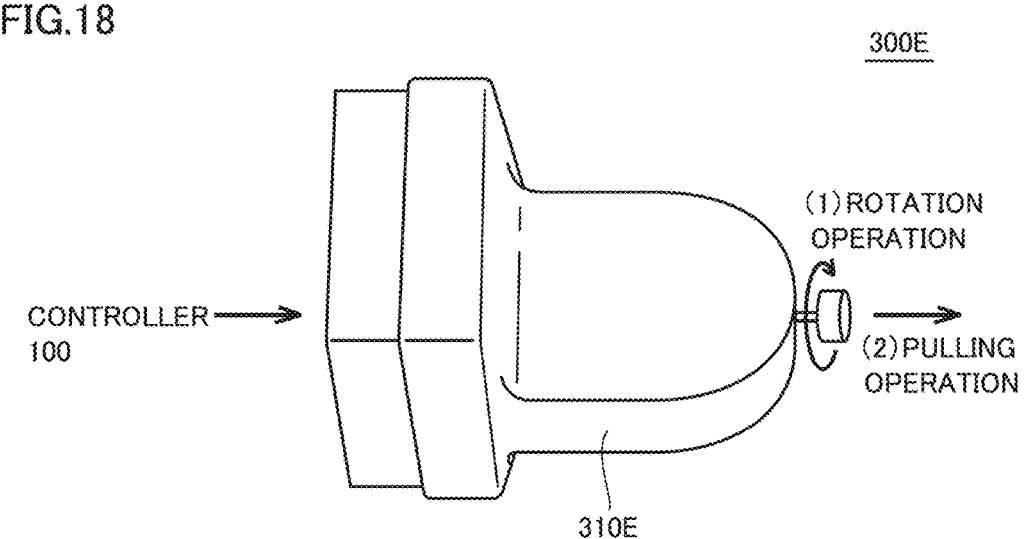
FIG. 18 shows an exemplary illustrative non-limiting drawing illustrating appearance of an attachment according to a first modification of the second embodiment.

Appearance of an attachment 300E according to a first modification of the second embodiment will be described with reference to FIG. 18. Attachment 300E has a housing 310E which can be connected to controller 100. A cylindrical operation portion 320E is arranged at an end opposite to a side of housing 310E connected to controller 100. Operation portion 320E can be pulled out of housing 310E. Operation portion 320E can also be rotated around a shaft thereof. By adopting such a construction, the user can perform an operation to rotate operation portion 320E (a rotation operation) and an operation to pull out operation portion 320E (a pulling operation). Attachment 300E includes a rotation mechanism and a pulling mechanism. A construction provided with only any one of the rotation mechanism and the pulling mechanism may be adopted.

Figure 19A:
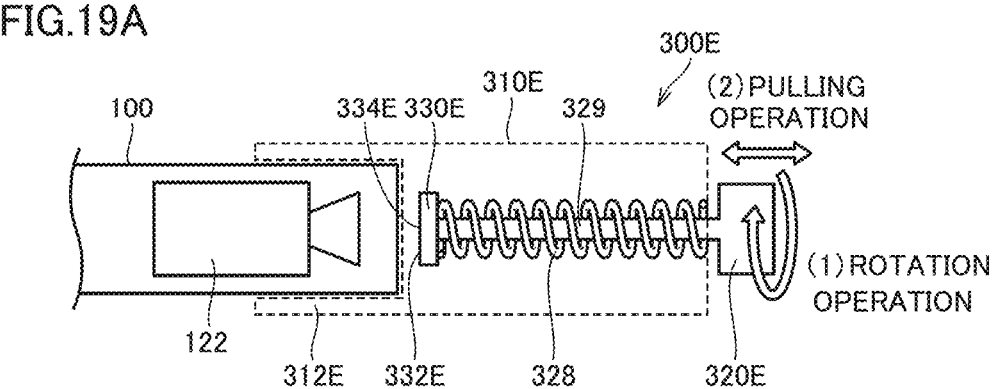
FIGS. 19A and 19B show exemplary illustrative non-limiting drawings illustrating a structure for detecting an operation by the user onto the attachment shown in FIG. 18.

A structure for detecting an operation by the user onto attachment 300E shown in FIG. 18 will be described with reference to FIGS. 19A and 19B. FIG. 19A shows one example of a cross-sectional structure of attachment 300E shown in FIG. 18. Referring to FIG. 19A, an opening is provided at one end of attachment 300E, and in attachment, a support portion 312E formed in a part of housing 310E of attachment 300E supports controller 100.

Operation portion 320E has a cylindrical portion 330E as the movable portion arranged at a position in housing 310E, of which position is changed in accordance with an operation onto operation portion 320E. Operation portion 320E includes a plunger 329 connected to cylindrical portion 330E and a coil 328 arranged on an outer circumferential side of plunger 329. Coil 328 is a biasing mechanism which generates reaction force between cylindrical portion 330E and housing 310E, and it generates reaction force to return operation portion 320E to an original position when the user pulls out operation portion 320E.

A region (marker) 332E for producing change in outer appearance in accordance with an operation by the user onto operation portion 320E is formed in a circular end surface of cylindrical portion 330E which faces camera 122 of controller 100. A reference marker 334E is formed in the center of rotation in the circular end surface of cylindrical portion 330E. A rotation operation is detected based on positional relation between reference marker 334E and marker 332E.

A marker having any region at a position displaced from the center on the circular end surface of cylindrical portion 330E is adopted as marker 332E. Marker 332E may be in any shape, however, a square or a perfect circle is preferred from a point of view of detection accuracy. Marker 332E is made of a material different in reflectance from other regions in the circular end surface of cylindrical portion 330E. Typically, a pattern of marker 332E is formed by using a reflective material. A retro-reflective material is more preferred as the reflective material. Marker 332E should only be configured similarly to marker 332A of attachment 300A according to the first embodiment, and similar description will not be repeated here.

Figure 19B:
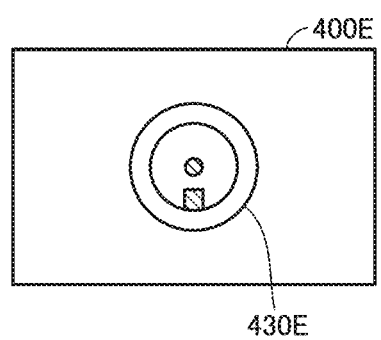

As shown in FIG. 19B, a camera image 400E obtained by shooting with camera 122 of controller 100 includes a subject image 430E corresponding to cylindrical portion 330E located in housing 300E. An operation by the user is detected based on a result of detection of change in outer appearance of subject image 430E.

More specifically, a rotation operation performed onto operation portion 320E is detected based on at which position (angle) a region corresponding to marker 332E is located in camera image 400E, with a region corresponding to reference marker 334E being defined as the reference. A pulling operation performed onto operation portion 320E is detected based on a size of the region corresponding to marker 332E in camera image 400E. Thus, at least one of a shape of and a pattern on cylindrical portion 330E as the movable portion viewed from camera 122 is changed in accordance with a rotation operation onto operation portion 320E. A position of cylindrical portion 330E as the movable portion is changed in accordance with a pulling operation onto operation portion 320E. Since such a method of detecting an operation by the user is the same as the method of detecting a rotation operation and a slide operation in the second embodiment described above, detailed description will not be repeated.

Since the modification is otherwise the same as the first embodiment, detailed description will not be repeated. In the first modification of the second embodiment, an operation by the user (a rotation operation and a pulling operation) onto operation portion 320E can independently be detected by shooting the inside of housing 310E of attachment 300E with camera 122.

<H. Attachment According to Second Modification of Second Embodiment>

Though a construction including a coil arranged around a plunger as a biasing mechanism against a pulling operation onto the operation portion in attachment 300E according to the first modification of the second embodiment described above has been exemplified, another biasing mechanism may be adopted. A winding mechanism providing back tension is adopted as the biasing mechanism in an attachment 300F according to a second modification of the second embodiment.

Figure 20A:
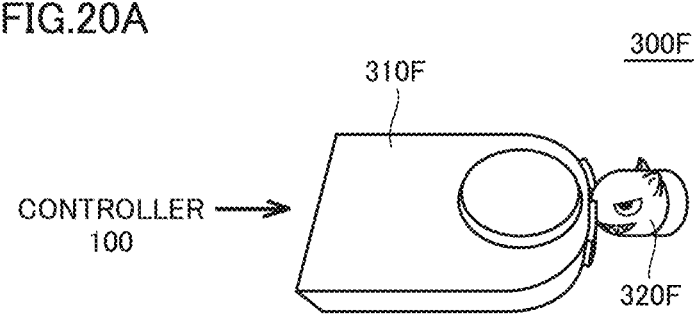
FIGS. 20A and 20B show exemplary illustrative non-limiting drawings illustrating appearance of an attachment according to a second modification of the second embodiment.
Figure 20B:
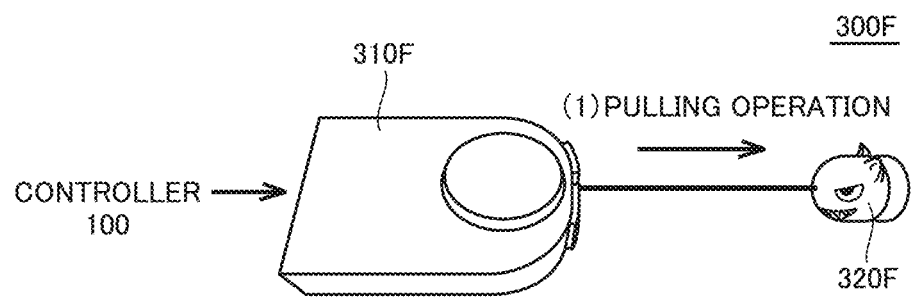

Appearance of attachment 300F according to the second modification of the second embodiment will be described with reference to FIGS. 20A and 20B. Attachment 300F has a housing 310F which can be connected to controller 100. A cylindrical operation portion 320F is arranged at an end opposite to a side of housing 310F connected to controller 100. As shown in FIG. 20B, operation portion 320F can be pulled out of housing 310F. By adopting such a construction, the user can perform an operation to pull out operation portion 320F (a pulling operation). Attachment 300F includes a pulling mechanism.

Figure 21:
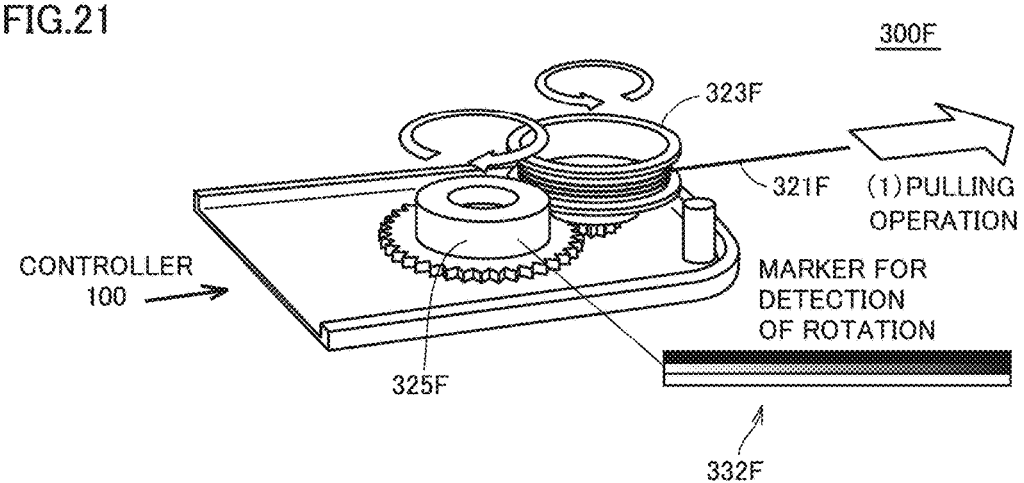
FIG. 21 shows an exemplary illustrative non-limiting drawing illustrating a structure for detecting an operation by the user onto the attachment shown in FIGS. 20A and 20B.

A structure for detecting an operation by the user onto attachment 300F shown in FIGS. 20A and 20B will be described with reference to FIG. 21. FIG. 21 shows a perspective view of a main portion of attachment 300F shown in FIGS. 20A and 20B.

Referring to FIG. 21, attachment 300F includes a reel 323F which stores a wire 321F connected to operation portion 320F and a gear 325F which is engaged with reel 323F to follow rotation of reel 323F. A spiral spring or the like is arranged around a rotation shaft of reel 323F and it generates back tension in a direction of winding of wire 321F. As wire 321F pulled out of reel 323F is longer, greater back tension is generated.

A region (marker) 332F for producing change in outer appearance in accordance with an operation by the user onto operation portion 320F is formed in a side surface of gear 325F facing camera 122 of controller 100. Marker 332F serves to detect rotation of reel 323F and gear 325F. In the example shown in FIG. 21, the marker is divided into three regions along an axial direction and two regions are used as white and black reference markers, respectively. The remaining region is used as a marker for detecting an amount of rotation (a rotation phase). The white reference marker and the black reference marker are set as the upper limit value and the lower limit value for luminance values, respectively, and an amount of rotation (a rotation phase) can be detected based on at which level a luminance value of the detected marker is located in the set range of luminance. Other methods described above may be adopted as a method of detecting an amount of rotation (a rotation phase). Thus, at least one of a shape of and a pattern on reel 323F as the movable portion viewed from camera 122 is changed in accordance with a rotation operation onto operation portion 320F. Since various methods of detecting an amount of rotation (a rotation phase) have been described, similar description will not be repeated here.

Since the modification is otherwise the same as the first embodiment, detailed description will not be repeated. In the second modification of the second embodiment, an operation by the user (a rotation operation and a pulling operation) onto operation portion 320F can independently be detected by shooting the inside of housing 310F of attachment 300F with camera 122.

<I. Attachment According to Third Embodiment>

An attachment 300G in which a plurality of types of pressing operations can be performed will now be described as a third embodiment.

Appearance of attachment 300G according to the third embodiment will be described with reference to FIG. 22. Attachment 300G simulates a large game controller, and includes a first operation portion 320G1 corresponding to a direction operation button of the game controller, and a second operation portion 320G2 and a third operation portion 320G3 corresponding to the A button and the B button of the game controller, respectively. Since attachment 300G is relatively large as shown in FIG. 22, a plurality of users can operate the attachment for fun.

An opening which can be connected to controller 100 and a support portion 312G formed around the opening are provided in a housing 310G of attachment 300G. Controller 100 is supported by support portion 312G while controller 100 is attached.

Figure 22:
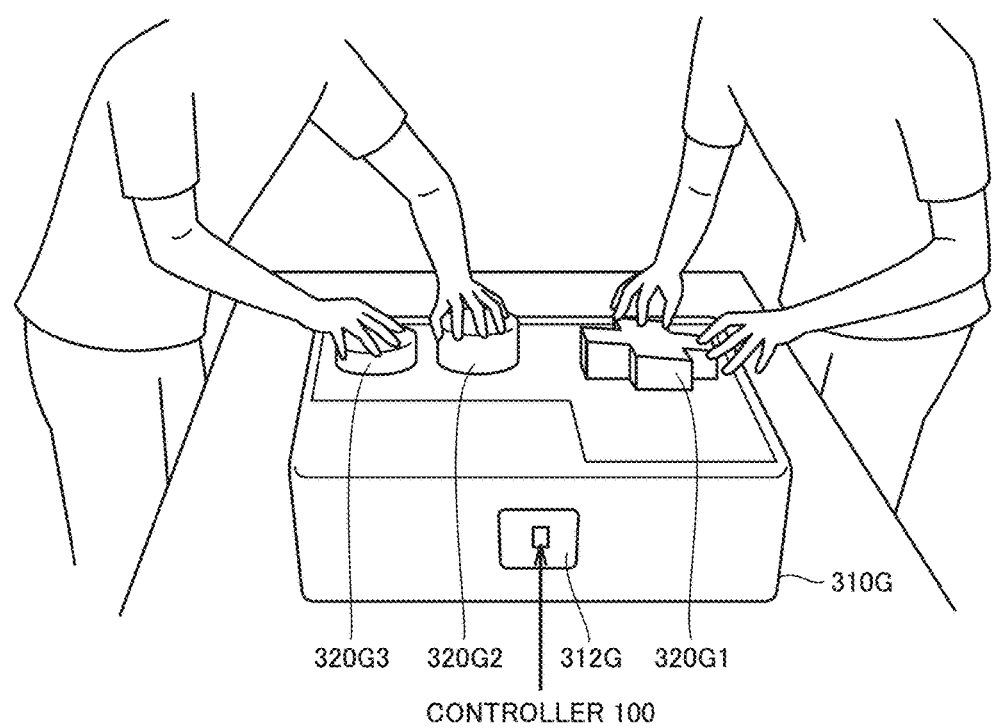
FIG. 22 shows an exemplary illustrative non-limiting drawing illustrating appearance of an attachment according to a third embodiment.

By adopting the construction as shown in FIG. 22, the user can press first operation portion 320G1, second operation portion 320G2, and third operation portion 320G3.

Figure 23:
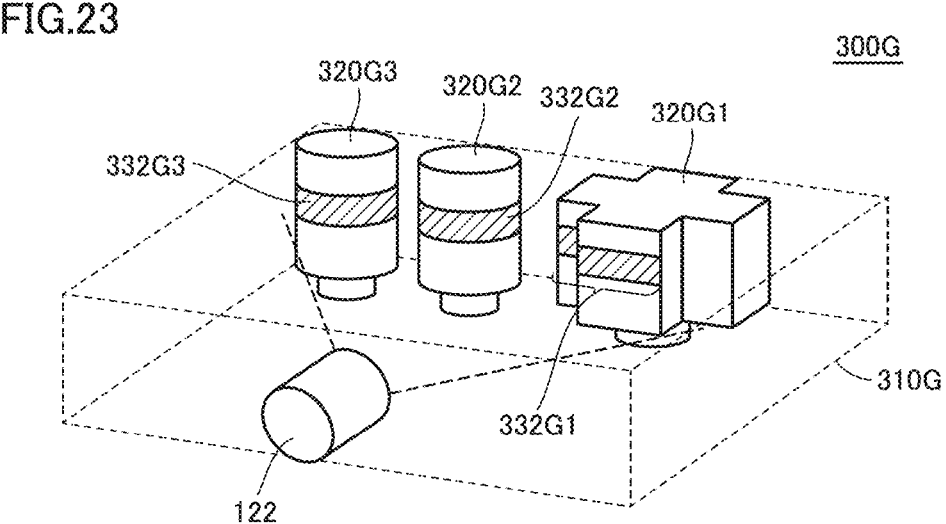
FIG. 23 shows an exemplary illustrative non-limiting drawing illustrating a structure for detecting an operation by the user onto the attachment shown in FIG. 22.

A structure for detecting an operation by the user onto attachment 300G shown in FIG. 22 will be described with reference to FIG. 23. The structure is arranged to function as movable portions of first operation portion 320G1, second operation portion 320G2, and third operation portion 320G3, and a first marker 332G1, a second marker 332G2, and a third marker 332G3 are arranged on respective surfaces of the movable portions so as to be included in a field of view of shooting with camera 122 of controller 100. These markers are made of a material different in reflectance from other regions in housing 310F. Typically, a pattern of each of first marker 332G1, second marker 332G2, and third marker 332G3 is formed with a reflective material. A retro-reflective material is more preferred as the reflective material. Since a configuration of these markers is described in the first embodiment, similar description will not be repeated here.

Processing for searching a camera image generated as a result of shooting of the inside of housing 310G with camera 122 of controller 100 for a position or the like of each marker is performed to detect an operation by the user onto the operation portion of attachment 300G (operation detection processing).

Specifically, first marker 332G1 is arranged such that a pattern is formed in at least two of side surfaces of first operation portion 320G1 which is a cube with multiple surfaces. Since first operation portion 320G1 can be pressed in any direction of at least four directions, in which direction it is pressed should be detected. Then, in which direction the operation portion is pressed is determined based on a position, an interval between positions, an orientation, or a difference in orientation of first marker 332G1 arranged in the plurality of side surfaces of first operation portion 320G1. A larger number of side surfaces where a pattern of first marker 332G1 is formed is preferred. Thus, in which direction first operation portion 320G1 functioning as a direction operation button is pressed is detected based on a behavior of a region corresponding to a marker arranged in the plurality of side surfaces.

A pressing operation onto second marker 332G2 and third marker 332G3 can be detected with a method the same as described in the first embodiment above.

As described with reference to FIG. 23, a position of the movable portion of first operation portion 320G1, second operation portion 320G2, and third operation portion 320G3 is changed in accordance with a pressing operation onto these operation portions.

Figure 24:
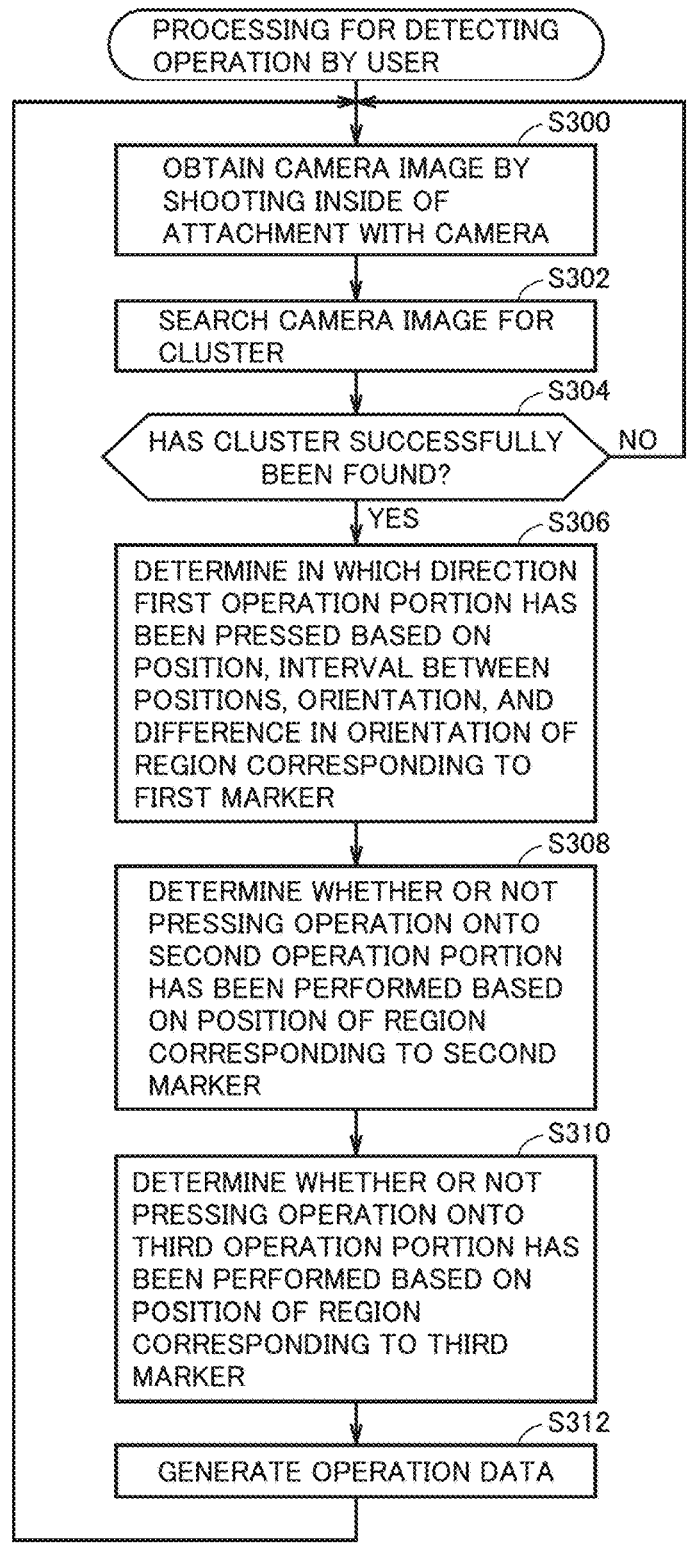
FIG. 24 shows an exemplary illustrative non-limiting flowchart illustrating a processing procedure for detecting an operation by the user onto the attachment according to the third embodiment.

A processing procedure for detecting an operation by the user onto attachment 300G according to the third embodiment will be described with reference to FIG. 24. Each step shown in FIG. 24 is performed by execution of control program 118 by CPU 112 of control unit 110 of controller 100 (see FIG. 2 for all of these elements) or execution of application 233 by CPU 212 of control unit 210 of main body 200 (see FIG. 2 for all of these elements).

A camera image is obtained by shooting the inside of attachment 300G with camera 122 of controller 100 (step S300). Processing for searching the obtained camera image for a cluster is performed (step S302). Whether or not the cluster has successfully been found is determined (step S304), and when the cluster has not been found (NO in step S304), processing in step S300 or later is repeated.

When the cluster has successfully been found (YES in step S304), in which direction first operation portion 320G1 has been pressed is determined based on a position, an interval between positions, an orientation, or a difference in orientation of a region corresponding to first marker 332G1 in the camera image (step S306).

In succession, whether or not a pressing operation onto second operation portion 320G2 has been performed is determined based on a position or the like of a region corresponding to second marker 332G2 in the camera image (step S308). When a coordinate of the detected region is located under a reference position, it is determined that the pressing operation has been performed. Otherwise, it is determined that the pressing operation has not been performed.

Similarly, whether or not a pressing operation onto third operation portion 320G3 has been performed is determined based on a position or the like of a region corresponding to third marker 332G3 in the camera image (step S310). When a coordinate of the detected region is located under a reference position, it is determined that the pressing operation has been performed. Otherwise, it is determined that the pressing operation has not been performed.

Then, operation data is generated based on a result of determination in steps S306 to S310 (step S312). Then, processing in step S300 or later is repeated.

Since the third embodiment is otherwise the same as the first embodiment, detailed description will not be repeated. In the third embodiment, an operation by the user (a pressing operation) onto first operation portion 320G1, second operation portion 320G2, and third operation portion 320G3 can independently be detected by shooting the inside of housing 310G of attachment 300G with camera 122.

<J. Attachment According to Fourth Embodiment>

An attachment 300H in which a slide operation can be performed will now be described as a fourth embodiment.

Figure 25:
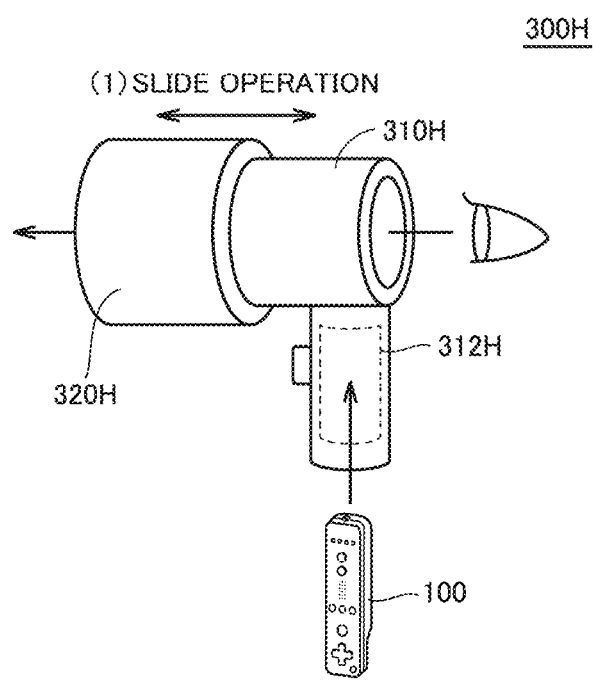
FIG. 25 shows an exemplary illustrative non-limiting drawing illustrating appearance of an attachment according to a fourth embodiment.

Appearance of attachment 300H according to the fourth embodiment will be described with reference to FIG. 25. Attachment 300H simulates a telescope, and an outer cylindrical portion 320H defined as an operation portion is constructed as being slidable with respect to a cylindrical housing 310H. Controller 100 can vertically be attached from a lower side of housing 310H, and controller 100 is supported by a support portion 312H. Housing 310H and outer cylindrical portion 320H are both hollow, and as the user looks into housing 310H from one end, the user can look through to the other end. Such usage can be made that a user zooms into a subject while the user looks into a telescope by holding attachment 300H like the telescope and performing a slide operation onto outer cylindrical portion 320H.

Figure 26:
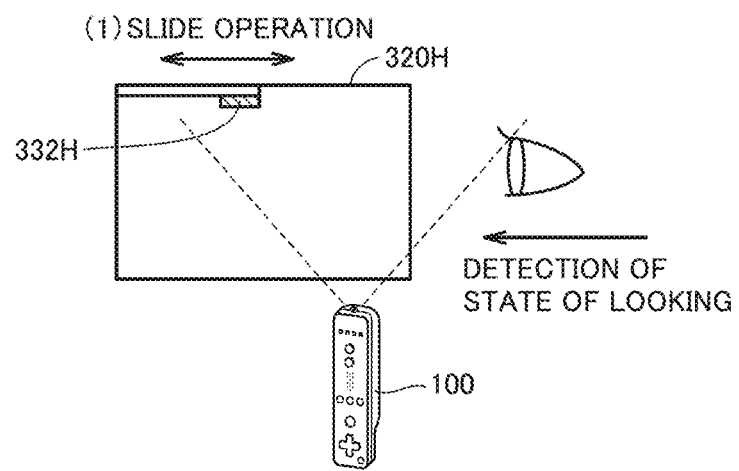
FIG. 26 shows an exemplary illustrative non-limiting drawing illustrating a structure for detecting an operation by the user onto the attachment shown in FIG. 25.

A structure for detecting an operation by the user onto attachment 300H shown in FIG. 25 will be described with reference to FIG. 26. While the controller is attached to attachment 300H, a marker 332H arranged on an inner surface side of outer cylindrical portion 320H and an opening in housing 310H through which the user looks are included in a field of view of shooting with camera 122 of controller 100.

A pattern of marker 332H is formed with a reflective material. A retro-reflective material is more preferred as the reflective material. Marker 332H should only be configured similarly to marker 332A of attachment 300A according to the first embodiment, and similar description will not be repeated here.

Whether or not a slide operation onto outer cylindrical portion 320H has been performed and an amount thereof can be detected by monitoring a position of marker 332H included in the field of view of shooting with camera 122 of controller 100. Since a position of marker 332H is also changed in coordination with movement of outer cylindrical portion 320H by the user, a slide operation onto outer cylindrical portion 320H can be detected by detecting a position of marker 332H from a camera image obtained by shooting with camera 122. Thus, a position of the movable portion is changed in accordance with a slide operation onto outer cylindrical portion 320H along a surface of housing 310H.

Whether or not the user is looking into housing 310H can be determined based on a quantity of light through the opening in housing 310H included in the field of view of shooting with camera 122 of controller 100. When the user is not looking into housing 310H, the opening is not closed and hence reflection of IR rays from light emitter 124 is less and a quantity of light received by camera 122 decreases. When the user looks into housing 310H, IR rays from light emitter 124 are reflected more at the surface of the face of the user and a quantity of light received by camera 122 increases. Whether or not the user is close to housing 310H can be determined based on such a degree of increase and decrease in quantity of light.

Thus, in attachment 300H according to the fourth embodiment, both of the slide operation onto outer cylindrical portion 320H and proximity to housing 310H by the user can be detected. An application as below can be provided based on these two types of detected information.

One example of an application using attachment 300H shown in FIG. 26 will be described with reference to FIG. 27. A content shown on display 204 (see FIG. 1), of the application shown in FIG. 27 is changed as the user operates attachment 300H.

Figure 27:
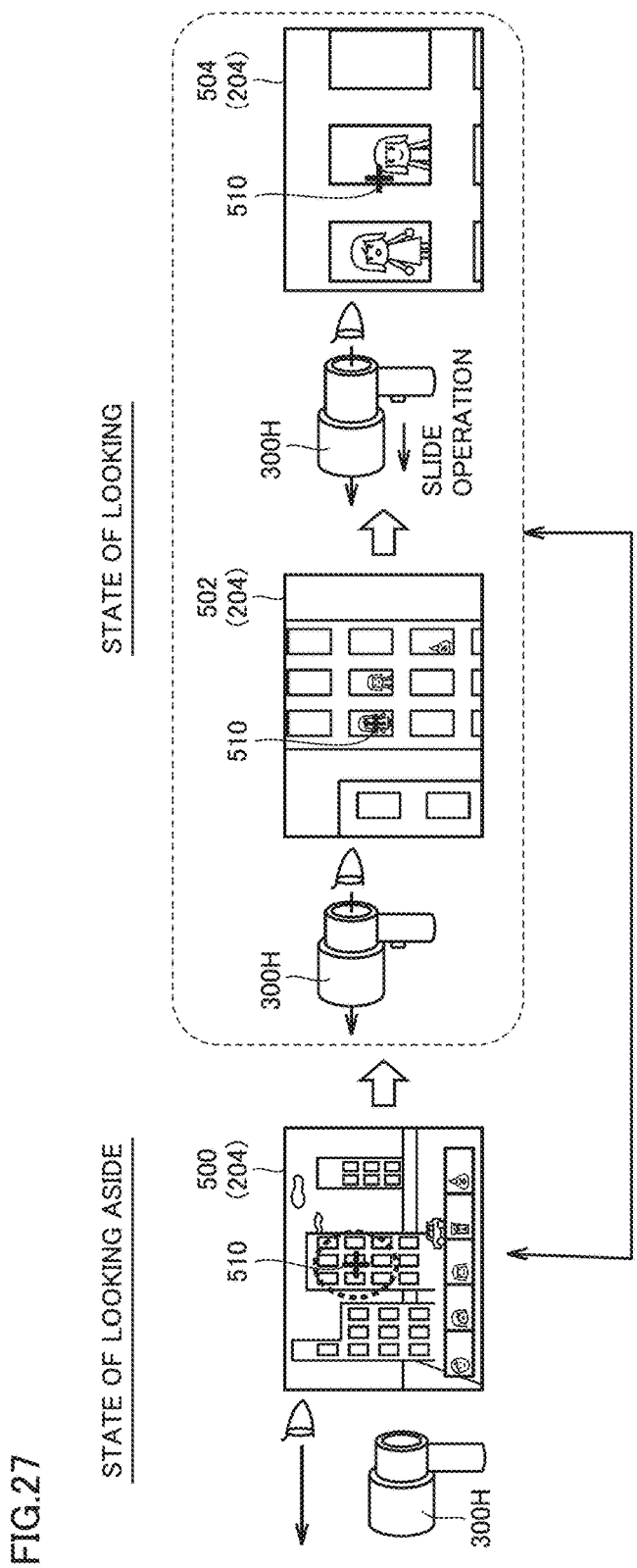
FIG. 27 shows an exemplary illustrative non-limiting drawing illustrating one example of an application using the attachment shown in FIG. 26.

Referring to FIG. 27, initially, while the user is not looking into attachment 300H (on the left side in the figure), display 204 shows a game object of interest as being zoomed out (in the example shown in FIG. 27, an image of an apartment) (an application image 500). While the user takes his/her eyes off attachment 300H, display 204 shows application image 500.

A pointing object 510 may be shown at a corresponding position by specifying a direction in which attachment 300H is oriented based on attitude information detected by gyro sensor 132 (see FIG. 2) of controller 100.

Then, when the user performs an operation to look into attachment 300H, a content of the application image shown on display 204 is further zoomed in. An object being looked with the telescope implemented by attachment 300H is reproduced on display 204.

A degree of simulated "zoom" is also changed in accordance with a degree of the slide operation onto outer cylindrical portion 320H by the user. While an amount of slide of outer cylindrical portion 320H is relatively small (in the center in the figure), a degree of zoom into the game object of interest is relatively low, and while an amount of slide of outer cylindrical portion 320H is relatively great (the right side in the figure), a degree of zoom into the game object of interest is relatively high.

Such zoom processing for the game object is continued while the user looks into attachment 300H, and when a state of looking is canceled, representation returns to an original application image.

Figure 28:
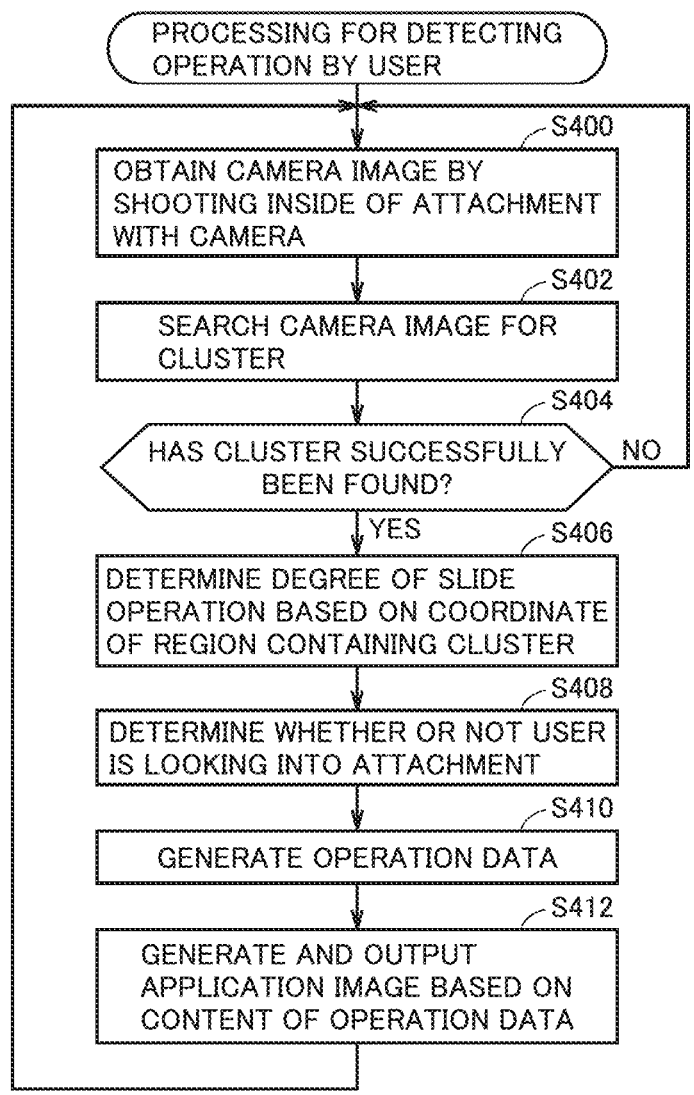
FIG. 28 shows an exemplary illustrative non-limiting flowchart illustrating a processing procedure involved with the application shown in FIG. 27.

A processing procedure involved with the application shown in FIG. 27 will be described with reference to FIG. 28. Each step shown in FIG. 28 is performed by execution of control program 118 by CPU 112 of control unit 110 of controller 100 (see FIG. 2 for all of these elements) or execution of application 233 by CPU 212 of control unit 210 of main body 200 (see FIG. 2 for all of these elements). Referring to FIG. 28, a camera image is obtained by shooting the inside of attachment 300H with camera 122 of controller 100 (step S400). Processing for searching the obtained camera image for a cluster is performed (step S402). Whether or not the cluster has successfully been found is determined (step S404), and when the cluster has not been found (NO in step S404), processing in step 5400 or later is repeated.

When the cluster has successfully been found (YES in step S404), a degree of a slide operation is determined based on a coordinate of a region containing the found cluster (step S406). In succession, whether or not the user is looking into attachment 300H is determined based on magnitude of a luminance value for each pixel included in the camera image (step S408). When an overall or local average value of luminance values of pixels included in camera image is relatively small, it is determined that the user is not looking into attachment 300H. In contrast, when an overall or local average value of luminance values of pixels included in the camera image is relatively large, it is determined that the user is looking into attachment 300H.

Then, operation data including a degree of the slide operation sensed in step S406 and whether or not the user is looking into attachment 300H determined in step 5408 is generated (step S410).

An application image is generated based on a content of the generated operation data and output to display 204 (see FIG. 1) (step S412). Then, processing in step 5400 or later is repeated.

As shown in FIG. 27, a zoom function can intuitively be realized for a user by using attachment 300H according to the fourth embodiment.

<K. Attachment According to Fifth Embodiment>

An attachment 300J which can directly detect an operation by the user will now be described as a fifth embodiment.

Figure 29:
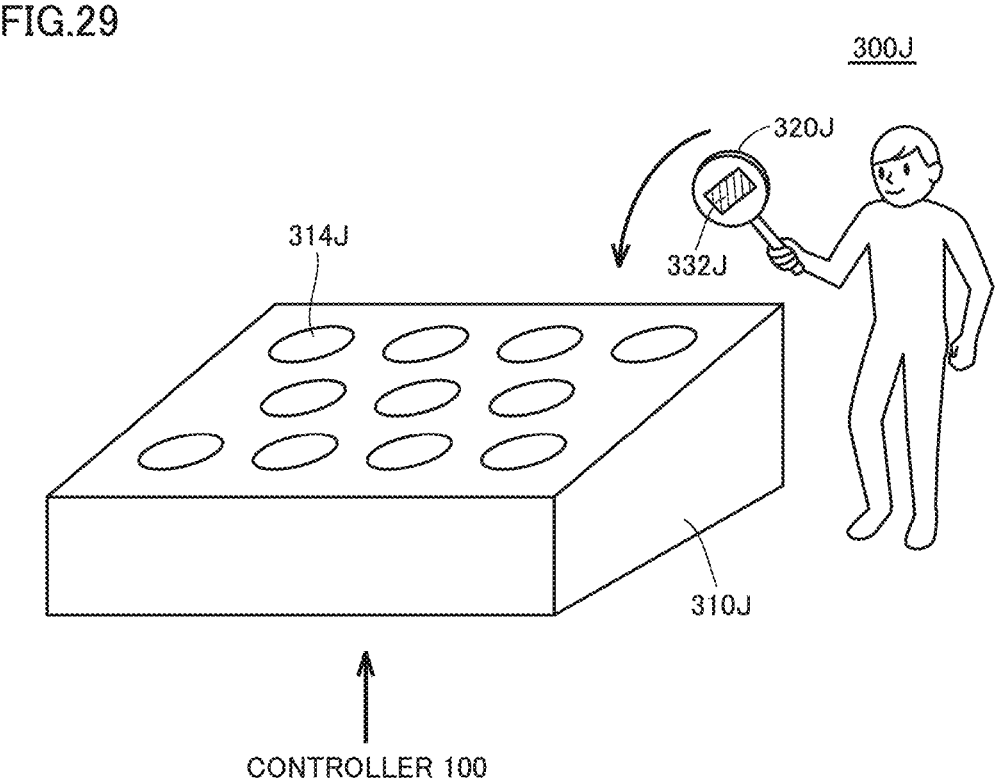
FIG. 29 shows an exemplary illustrative non-limiting drawing illustrating appearance of an attachment according to a fifth embodiment.

Appearance of attachment 300J according to the fifth embodiment will be described with reference to FIG. 29. Attachment 300J is directed to a configuration which can provide what is called "whack-a-mole" and a plurality of holes 314J are provided in an upper surface of a housing 310J. The user performs an operation to close these holes 314J with a stick 320J corresponding to the operation portion. A tip end of stick 320J is widened so as to be adapted to a size of hole 314J and a marker 332J is arranged in at least one surface. A pattern of marker 332J is formed with a reflective material. A retro-reflective material is more preferred as the reflective material. Controller 100 is attached on a lower surface side of housing 310J.

Figure 30A:
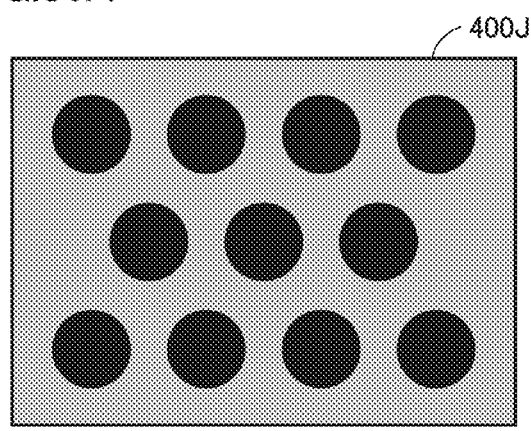
FIGS. 30A and 30B show exemplary illustrative non-limiting drawings illustrating processing for detecting an operation by the user onto the attachment shown in FIG. 29.
Figure 30B:
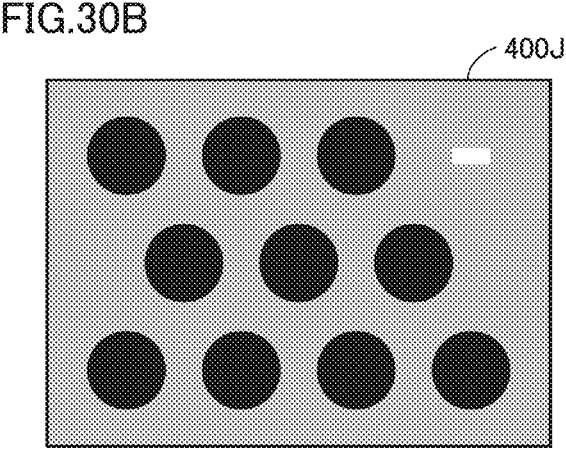

Processing for detecting an operation by the user onto attachment 300J shown in FIG. 29 will be described with reference to FIGS. 30A and 30B. FIG. 30A shows one example of a camera image 400J shot while an operation by the user to close hole 314J is not performed, and FIG. 30B shows one example of camera image 400J shot while an operation by the user to close upper left hole 314J with stick 320J is performed.

As shown in FIG. 30A, while the user is not performing an operation to close hole 314J, portions corresponding to a plurality of holes 314J are relatively low in luminance. When hole 314J is not closed, reflection of IR rays from light emitter 124 is less. When the user performs an operation to close any hole 314J as shown in FIG. 30B, a portion corresponding to closed hole 314J is relatively high in luminance as a whole and a small region corresponding to marker 332J is particularly high in luminance. Detection of such a small region corresponding to marker 332J can be concluded as detection of an operation to close hole 314J located at a corresponding position.

A "whack-a-mole" game or a game similar thereto can be provided to a user while a simplified configuration is maintained by using attachment 300J according to the fifth embodiment.

<L. Advantages>

According to the present embodiment, an attachment which can implement various game operations by being configured to be attached to a game controller or the like while it maintains a simplified configuration can be provided. Typically, the attachment according to the present embodiment can independently detect one or more of a pressing operation, a rotation operation, a slide operation, and a pulling operation with the use of a single camera 122.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An attachment configured to be attached to a game controller with a camera, the attachment comprising:
   a housing; and
   an operation portion in the housing,
   the housing comprising a support portion which supports the game controller such that a direction of shooting of the camera is oriented to inside of the housing, and
   the operation portion comprising a movable portion in the housing, a position of the movable portion being changed in accordance with a pressing operation onto the operation portion, and at least one of a shape of and a pattern on the movable portion viewed from the camera being changed in accordance with a rotation operation onto the operation portion.

2. The attachment according to claim 1, wherein the movable portion is made of a reflective material.

3. The attachment according to claim 1, wherein at least one of the shape of and the pattern on the movable portion viewed from the camera is gradually changed by rotation along a direction substantially in parallel to a direction of the pressing operation onto the operation portion.

4. The attachment according to claim 3, wherein the movable portion has a varying width viewed from the camera.

5. The attachment according to claim 4, wherein the movable portion is formed in a tapered shape.

6. The attachment according to claim 3, wherein a position of the movable portion viewed from the camera is changed in accordance with a sliding operation onto the operation portion.

7. The attachment according to claim 4, wherein the operation portion has a first slide mechanism which slides in a direction substantially in parallel to the direction of shooting of the camera.

8. The attachment according to claim 4, wherein the operation portion has a second slide mechanism which slides in a direction substantially perpendicular to the direction of shooting of the camera.

9. The attachment according to claim 1, wherein the camera includes an infrared camera.

10. The attachment according to claim 1, wherein the operation portion further comprises a biasing mechanism.

11. A game system comprising:
    a game controller with an infrared camera;
    an attachment configured to support the game controller; and
    a main body configured to communicate with the game controller, the attachment comprising
a housing, and
an operation portion in the housing,
the housing comprising a support portion which supports the game controller such that a direction of shooting of the infrared camera is oriented to inside of the housing,
the operation portion comprising a movable portion in the housing, a position of the movable portion being changed in accordance with a pressing operation onto the operation portion, and at least one of a shape of and a pattern on the movable portion viewed from the infrared camera being changed in accordance with a rotation operation onto the operation portion,
the game controller transmitting image data on an infrared image obtained by shooting with the infrared camera to the main body, and
the main body detecting an operation onto the operation portion based on the image data and performing corresponding game processing based on the detected operation.

12. An attachment configured to be attached to a game controller with a camera, the attachment comprising:

a housing; and an operation portion in the housing, the housing comprising a support portion which supports the game controller such that a direction of shooting of the camera is oriented to inside of the housing, and the operation portion comprising a movable portion in the housing, a position of the movable portion being changed in accordance with a sliding operation onto the operation portion along a surface of the housing, and at least one of a shape of and a pattern on the movable portion viewed from the camera being changed in accordance with a rotation operation onto the operation portion.

* * * * *